(12) United States Patent
Sasaki et al.

(10) Patent No.: US 8,288,071 B2
(45) Date of Patent: *Oct. 16, 2012

(54) RESIN PARTICLE LIQUID DISPERSION FOR ELECTROSTATIC IMAGE DEVELOPING TONER, ELECTROSTATIC IMAGE DEVELOPING TONER, PRODUCTION METHOD THEREOF, DEVELOPER AND IMAGE FORMING METHOD

(75) Inventors: Yuki Sasaki, Kanagawa (JP); Satoshi Hiraoka, Kanagawa (JP); Fumiaki Mera, Kanagawa (JP); Hirotaka Matsuoka, Kanagawa (JP); Yasuo Matsumura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/453,881

(22) Filed: May 26, 2009

(65) Prior Publication Data

US 2009/0297977 A1  Dec. 3, 2009

Related U.S. Application Data

(62) Division of application No. 11/311,277, filed on Dec. 20, 2005, now abandoned.

(30) Foreign Application Priority Data

Jul. 20, 2005  (JP) ................................. 2005-209848

(51) Int. Cl.
*G03G 9/12* (2006.01)

(52) U.S. Cl. ........... 430/137.17; 430/109.3; 430/137.12; 430/137.15; 524/591

(58) Field of Classification Search .................. 524/589; 430/111.4, 137.14, 124

See application file for complete search history.

(56) References Cited

U.S. PATENT DOCUMENTS

| 4,355,154 | A  | 10/1982 | Saam et al. |
| 5,346,797 | A  | 9/1994  | Kmiecik-Lawrynowicz et al. |
| 6,040,104 | A  | 3/2000  | Nakamura et al. |
| 6,413,691 | B2 | 7/2002  | Daimon et al. |
| 6,500,594 | B2 | 12/2002 | Hamano et al. |
| 7,005,480 | B2 * | 2/2006 | Kinsho et al. ................. 525/390 |
| 7,147,980 | B2 | 12/2006 | Itakura et al. |
| 7,420,020 | B2 * | 9/2008 | Yamamoto et al. ........... 525/412 |
| 7,455,944 | B2 * | 11/2008 | Maehata et al. ........... 430/109.3 |
| 7,473,511 | B2 * | 1/2009 | Matsumura et al. ..... 430/137.14 |
| 7,560,213 | B2 * | 7/2009 | Matsuoka et al. .......... 430/109.4 |
| 7,619,041 | B2 * | 11/2009 | Yamamoto et al. ........... 525/411 |
| 2001/0026899 | A1 * | 10/2001 | Uchida et al. ............... 430/108.4 |
| 2001/0046636 | A1 * | 11/2001 | Daimon et al. ............ 430/109.4 |
| 2002/0106573 | A1 | 8/2002 | Hamano et al. |
| 2003/0104296 | A1 * | 6/2003 | Hamano et al. ............ 430/107.1 |
| 2003/0175611 | A1 * | 9/2003 | Fujii et al. ..................... 430/124 |
| 2004/0019178 | A1 | 1/2004 | Gross et al. |
| 2004/0253530 | A1 * | 12/2004 | Serizawa et al. .............. 430/124 |
| 2005/0255397 | A1 * | 11/2005 | Yamamoto et al. ......... 430/109.3 |
| 2006/0110674 | A1 | 5/2006 | Maehata et al. |
| 2006/0127790 | A1 | 6/2006 | Matsumura et al. |
| 2006/0165989 | A1 | 7/2006 | Takikawa et al. |
| 2007/0148579 | A1 * | 6/2007 | Mera et al. ................. 430/109.4 |
| 2009/0297977 | A1 * | 12/2009 | Sasaki et al. .................. 430/113 |
| 2012/0107741 | A1 * | 5/2012 | Hiraoka et al. .......... 430/137.12 |

FOREIGN PATENT DOCUMENTS

| JP | B2-4-24702 | 4/1992 |
| JP | A-2001-42564 | 2/2001 |
| JP | A-2001-117268 | 4/2001 |
| JP | A-2001-290308 | 10/2001 |
| JP | A-2002-49180 | 2/2002 |
| JP | 2004-191927 | * 7/2004 |
| JP | A-2004-191927 | 7/2004 |
| JP | A-2004-233983 | 8/2004 |

OTHER PUBLICATIONS

Barrere et al. Polymer 44 (2003) pp. 2833-2841.*
Tang, P. L. et al. "Miniemulsion Polymerization—A Comparative Study of Preparative Variables." *J. Appl. Polym. Sci.*, vol. 43, pp. 1059-1066, 1991.
Barrere, Matthieu and Katharina Landfester. "Polyester synthesis in aqueous miniemulsion." *Polymer.*, vol. 44, pp. 2833-2841, 2003.

* cited by examiner

*Primary Examiner* — Liam Heincer
*Assistant Examiner* — Michael A Salvitti
(74) *Attorney, Agent, or Firm* — Oliff & Berridge, PLC

(57) ABSTRACT

A resin particle liquid dispersion for an electrostatic image developing toner, comprising: an aqueous medium; and a resin particle dispersed in the aqueous medium to have a median diameter of 0.05 to 2.0 μm, the resin particle comprising a polycondensable polymer obtained by polycondensing polycondensable monomers, wherein a storage modulus GL(30) of the resin particle at 30° C. is $1 \times 10^7$ Pa or more, and a melting point of the polycondensable polymer is from 45 to 110° C.

9 Claims, No Drawings

RESIN PARTICLE LIQUID DISPERSION FOR ELECTROSTATIC IMAGE DEVELOPING TONER, ELECTROSTATIC IMAGE DEVELOPING TONER, PRODUCTION METHOD THEREOF, DEVELOPER AND IMAGE FORMING METHOD

This is a Division of application Ser. No. 11/311,277 filed Dec. 20, 2005, which claims priority to Japanese Patent Application No. 2005-209848 filed Jul. 20, 2005. The disclosure of the prior applications are hereby incorporated by reference herein in their entirety.

BACKGROUND OF THE INVENTION

1. Field of the Invention

The present invention relates to a resin particle liquid dispersion for an electrostatic image developing toner excellent in various properties such as color formability and OHP transparency and suitably usable for forming an image by an electrophotographic process, an electrostatic recording process or the like, a toner using the resin particle liquid dispersion, production processes thereof, a developer using the toner and an image forming method.

2. Description of the Related Art

With rapid spread of digitization technology, high image quality is currently demanded for the output such as print and copy by users at the home or office or in the publishing field. In order to meet this requirement for high image quality, the toner for use particularly in electrophotography is reduced in the particle diameter with an attempt to enhance the resolution, and the particle diameter is at present reduced even to the region of 5 µm. In this case, in view of production energy and cost, reduction in the toner particle diameter can be hardly attained by a kneading-pulverization method conventionally employed for the production of toner, and the trend is now shifting to a technique of preparing a resin particle liquid dispersion by a so-called chemical production process in an aqueous medium, such as suspension-polymerization, dissolution-suspension or emulsion polymerization-aggregation, and granulating the resin particle liquid dispersion to produce a toner.

In general, control of particle diameter and particle diameter distribution of toner particles is indispensable for a toner so as to obtain a high-quality image. A toner produced particularly by a kneading-pulverization or suspension-polymerization method having a tendency of bringing about a broad particle diameter distribution passes through a classification step to obtain toner particles having a desired particle diameter and therefore, the yield is liable to decrease.

With respect to the method for polymerizing a resin in an aqueous medium, a suspension-polymerization method, a dissolution-suspension method and an emulsion polymerization-aggregation method are generally employed at present. As for the emulsion polymerization, the polymerization of monomers by using a surfactant in an amount less than the critical micelle concentration (CMC) and a co-surfactant in combination in the presence of a polymerization initiator for the monomer emulsion is particularly known as so-called "miniemulsion polymerization" which is described, for example, in P. L. Tang, E. D. Sudol, C. A. Silbi and M. S. El-Aasser, *J. Appl. Polym. Sci.*, Vol. 43, page 1059 (1991).

The conventional emulsion polymerization method is a method of polymerizing an aqueous emulsion of monomer particles having a particle diameter of about several µm by using a water-soluble polymerization initiator in the presence of a surfactant not less than the critical micelle concentration (CMC). In the conventional method, the polymerization is initiated in a surfactant micelle and a monomer is diffused and supplied from the monomer particle to grow and form polymer particles.

On the other hand, the miniemulsion polymerization method is advantageous in that since a monomer is polymerized in the monomer particle, migration (e.g., diffusion) of a substance is not involved, and polymer particles uniform in the shape and properties can be formed. That is, in the miniemulsion polymerization method, the diameter of polymer particles can be controlled by controlling the liquid droplet size of a monomer liquid dispersion.

Examples of the invention relating to a toner produced by using such a miniemulsion polymerization method include the followings. For example, JP-A-2001-290308 discloses a production process of an electrostatic image developing toner, comprising aggregating colorant-containing polymer particles obtained by miniemulsion polymerization of a monomer and a colorant. JP-A-2002-49180 discloses a toner obtained by salting-out/fusing resin particles produced through multi-step polymerization, where the resin particle except for the outermost layer contains a resin particle produced by using miniemulsion polymerization. These studies all are made on the toner production process involving a radical polymerization reaction by miniemulsion polymerization.

In Mattheineu Barrere and Kaharins Landfester, *Polymer.*, Vol. 44, page 2833 (2003), the results when a polyester is polycondensed from a dodecane diacid and a dodecane diol or the like in water are described. However, in this and other research papers, there is not found a case of studying on physical properties of a polycondensed resin particle obtained by a miniemulsion polymerization method or on a technique for obtaining a polycondensable polymer having specific physical properties. Needless to say, a case of studying on the application of a miniemulsion polymerization method comprising a polycondensation reaction to the production of a toner is not found.

Also, with the increasing demand to save energy necessary for the image formation, the toner fixing temperature must be more lowered so as to realize power saving at the fixing step. When the toner fixing temperature is lowered, in addition to power saving, the waiting time until the fixing member surface reaches the fixing possible temperature after turning on the power source, so-called warm-up time, can be shortened and the life of the fixing member can be prolonged.

For lowering the toner fixing temperature, a method of decreasing the glass transition point of a toner particle is generally employed. However, if the glass transition temperature is excessively lowered, aggregation (blocking) of powder particles readily occurs or preservability of the toner on the fixed image is lost (generally called "document offset"), and lowering of the toner fixing temperature and preservability of the toner can be hardly attained at the same time. In order to attain both low-temperature fixing and toner preservability, a so-called sharp-melt property of causing abrupt decrease in the viscosity of the toner in a high-temperature region must be imparted while keeping the glass transition point of the toner at a higher temperature.

However, the resin used for the toner usually has a certain width in the glass transition point, molecular weight or the like and therefore, the composition and molecular weight of the resin must be made extremely uniform so as to obtain a sharp-melt property. For obtaining such a resin, it is necessary to use a special production process or adjust the molecular weight of the resin by subjecting the resin to a treatment such as chromatography. In this case, the cost inevitably rises or an unnecessary resin (waste) is yielded at the production of a highly uniform resin and this is not preferred also from the aspect of environmental protection awareness in recent years.

Accordingly, a toner for electrophotography having a low fixing temperature and a sharp-melt property and causing no offset even in a high-temperature region is keenly demanded.

In general, as means for satisfying all of blocking inhibition, image preservability and low-temperature fixing, a method of using a crystalline resin as the binder resin has long been known (see, for example, JP-B-4-24702). The crystalline resin has a melting point to afford great decrease in the viscosity at a specific temperature, and the temperature difference between the start of thermal activity of a resin molecule and the fixing possible region can be made small, so that an excellent low-temperature fixing property can be imparted. On the other hand, in the case of a non-crystalline resin, the viscosity gradually decreases after the resin molecule starts its thermal activity at the glass transition point, and the temperature difference until the fixing possible region is large, as result, a low-temperature fixing property cannot be ensured. In the crystalline resin, the viscosity tends to continuously decrease even at a temperature higher than the melting point, and the melted toner permeates into paper to provide an effect of preventing generation of offset, but excessive permeation of the melted toner into paper disadvantageously occurs to cause a problem that an image with uniform and high density cannot be obtained. Furthermore, the crystalline resin has insufficient hardness at normal temperature and, for example, this may allow for deformation of the toner particle on mixing with a carrier in a developing machine or deformation of the toner particle by the shear force imposed from a cleaning blade, giving rise to deleterious change of electrification cleaning failure or insufficient strength of the produced image.

In order to solve these problems, many techniques of using a crystalline polymer as the binder resin in combination with a non-crystalline polymer have been proposed. For example, JP-A-2001-42564 proposes a technique of fusing resin particles containing a crystalline substance and an amorphous polymer, in an aqueous medium. However, in this invention, a crystalline polyester resin is produced by a conventional method. Generally, in the case where a polyester resin produced through polycondensation at a high temperature of 150° C. or more is used for the chemical process toner, there is a problem that a huge energy is necessary to disperse and emulsify the once bulk-polymerized resin to a toner diameter, the use and recovery of an organic solvent requires a large-scale facility investment, or the obtained resin particle liquid dispersion suffers from a board resin particle diameter distribution. Furthermore, in the above-described method, it is difficult to effect aggregation and coalescence of the toner by mixing a latex containing a crystalline substance with a latex containing an amorphous substance. This is ascribable to the difference between the surface electric charge of the crystalline polyester latex and the surface electric charge of the vinyl-based latex.

Similarly, JP-A-2004-191927 discloses an electrostatic image developing toner comprising a crystalline polyester as the binder resin and an amorphous polymer, the toner surface being covered with a surface layer mainly comprising the amorphous polymer, wherein the crystalline polyester content is from 30 to 80 wt %, the proportion of the crystalline polyester contained in the outermost surface of the electrostatic image developing toner is 15 atomic % or less, and the average thickness of the surface layer is from 0.01 to 0.5 μm. However, this toner is produced by mixing an amorphous polymer liquid dispersion and a crystalline polyester liquid dispersion at the aggregation step, and uneven distribution of constituent components is liable to occur during aggregation. Furthermore, the method of producing the crystalline polyester liquid dispersion has a problem that a high energy is necessary as described above or the production process is long and complicated.

Also, many techniques of using a polymer obtained by chemically bonding a crystalline polymer and a non-crystalline polymer have been invented. Examples thereof include JP-A-2004-233983. This invention is a toner comprising a resin formed by reacting an epoxy group of an epoxy group-containing vinyl resin with a carboxyl group of a resin containing a polyester unit and a carboxyl group, wherein the toner has a specific viscoelasticity. However, since a reaction process at a high temperature is necessary for obtaining resin particles by this production process as in conventional techniques and the toner is produced by a melting-kneading production process, the energy consumption is large and the obtained toner has a hardly alignable shape and a broad particle diameter distribution. JP-A-2001-117268 also discloses a toner comprising a crystalline polyester having a polymerization crosslinked structure introduced by a radical reaction of unsaturated bonds, but the toner produced by suspension polymerization has a broad particle diameter distribution and therefore, high image quality is hardly obtained. Furthermore, the polycondensation reaction is based on a conventional method and requires a high energy.

In this way, as for the toner using a crystalline resin, it is difficult to achieve low-energy production of a toner successfully controlled in the viscoelasticity, electrostatic property, toner particle diameter and particle diameter distribution. Also, in the mixing of a crystalline resin and a non-crystalline resin, various contradictory properties are required to satisfy at the same time, and a toner satisfied in these and other toner properties such as powder fluidity and coloring property is not provided at present.

SUMMARY OF THE INVENTION

The present invention provides a resin particle liquid dispersion for an electrostatic image developing toner, in which resin particles having a viscoelasticity, a particle diameter and a particle diameter distribution suitable for a toner are dispersed. Also, the present invention provides a method for producing an electrostatic image developing toner by utilizing the resin particle liquid dispersion, in which not only enhanced fixing property and high image quality are obtained but also a simple process requiring a low energy is ensured.

The above-described objects of the present invention can be attained by the following <1> to <6>.

<1> A resin particle liquid dispersion for an electrostatic image developing toner, comprising: an aqueous medium; and a resin particle dispersed in the aqueous medium to have a median diameter of 0.05 to 2.0 μm, the resin particle comprising a polycondensable polymer obtained by polycondensing polycondensable monomers, wherein a storage modulus GL(30) of the resin particle at 30° C. is $1 \times 10^7$ Pa or more, and a melting point of the polycondensable polymer is from 45 to 110° C.

<2> A method for producing the resin particle liquid dispersion for an electrostatic image developing toner described in <1>, comprising: a step of preparing an emulsified liquid dispersion comprising an aqueous medium and an oil phase comprising at least polycondensable monomers, the oil phase being dispersed in the aqueous medium; and a step of polycondensing the polycondensable monomers.

<3> A method for producing an electrostatic image developing toner, comprising: a step of aggregating resin particles in a liquid dispersion containing at least a resin particle liquid dispersion to obtain aggregate particles; and a step of heating and coalescing the aggregate particles, wherein the resin particle liquid dispersion is a resin particle liquid dispersion for an electrostatic image developing toner described in <1> above or a resin particle liquid dispersion for an electrostatic image developing toner produced by the production method described in <2> above.

<4> An electrostatic image developing toner obtained by the production method described in <3> above.

<5> An electrostatic image developer comprising: the electrostatic image developing toner described in <4> above; and a carrier.

<6> An image forming method comprising a latent image-forming step of forming an electrostatic latent image on the surface of a latent image-holding member, a development step of developing the electrostatic latent image formed on the surface of the latent image-holding member with a developer containing a toner to form a toner image, a transfer step of transferring the toner image formed on the surface of the latent image-holding member to the surface of a transferee member, and a fixing step of heat-fixing the toner image transferred to the surface of the transferee member, wherein the toner is the electrostatic image developing toner described in <4> above or the developer is the electrostatic image developer described in <5> above.

DETAILED DESCRIPTION OF THE INVENTION

That is, the present invention relates to a resin particle liquid dispersion having dispersed therein resin particles containing a polycondensable polymer having specific properties obtained by polycondensing polycondensable monomers in an aqueous medium. The toner produced by using this resin particle liquid dispersion not only ensures enhanced fixing property and high image quality but also can be produced by a simple process with low energy.

The present invention is described in detail below.
(Resin Particle Liquid Dispersion for Electrostatic Image Developing Toner)

The resin particle liquid dispersion for an electrostatic image developing toner of the present invention (hereinafter sometimes simply referred to as a "resin particle liquid dispersion") is a resin particle liquid dispersion where resin particles containing a polycondensable polymer (hereinafter sometimes referred to as a "polycondensed resin") obtained by polycondensing polycondensable monomers in an aqueous medium are dispersed to have a median diameter of 0.5 to 2.0 μm in an aqueous medium, and is characterized in that the storage modulus GL(30) at 30° C. of the resin particle is $1 \times 10^7$ Pa or more and the melting point of the polycondensable polymer is from 45 to 110° C. The resin particle liquid dispersion of the present invention is preferably produced by the production process of a resin particle liquid dispersion, which is described later.

The median diameter (center diameter) of the resin particle in the resin particle liquid dispersion of the present invention is from 0.05 to 2.0 μm, preferably from 0.1 to 1.5 μm, more preferably from 0.1 to 1.0 μm.

Such dispersion can be attained by effecting uniform mixing and emulsion-dispersion in a shear mixing apparatus such as piston homogenizer, microfluidizing device (for example, "Microfluidizer" manufactured by Microfluidics) and ultrasonic disperser. If the median diameter of the resin particle is too small, the aggregating property at the formation of particles changes for the worse to readily generate isolated resin particles or the viscosity of the system tends to increase, which makes it difficult to control the particle diameter. On the other hand, if the median diameter is excessively large, the particle formation is readily associated with generation of coarse powder to worsen the particle size distribution and at the same time, isolation of the releasing agent such as wax is liable to occur, giving rise to reduction in the releasability at the fixing or in the offset-generating temperature.

The median diameter of the resin particle can be measured, for example, by a Coulter counter (TA II, Manufactured by Beckman Coulter Inc.).

The storage modulus GL(30) at an angular frequency of 1 rad/sec and 30° C. of the resin particle of the present invention is $1 \times 10^7$ Pa or more, preferably from $1 \times 0$ to $1 \times 10^{11}$, more preferably from $1 \times 10^7$ to $5 \times 10^{10}$. If the storage modulus GL(30) is less than $1 \times 10^7$ Pa, for example, in the case of a two-component developing system, the toner particle is deformed by the pressure or shear force imposed from the carrier when mixed with a carrier in a developing machine and fails in stably maintaining the electrostatic developing property, or the toner particle is deformed by the shear force imposed from a cleaning blade at the cleaning of toner on an electrostatic latent image-supporting member and this may cause a cleaning failure. Furthermore, the toner storability may be worsened, particularly, aggregation of toners with each other (blocking phenomenon) may occur during storage at a high temperature and a high humidity.

In the present invention, change in the storage modulus of the resin particle from $10^6$ Pa to $10^4$ Pa preferably occurs by a temperature change within 15° C., more preferably within 10° C. When the temperature change is in this range, the so-called sharp-melt property is high, so that fixing can be performed at a low temperature, a satisfactory effect of reducing the energy consumption can be obtained, and the fixing latitude can be sufficiently broad.

Furthermore, in the present invention, change in the storage modulus of the resin particle from $10^7$ Pa to $10^3$ Pa preferably occurs by a temperature change within 25° C., more preferably within 20° C. This change in the storage modulus corresponds to the change in viscosity and means that change from the viscosity where the attachment of toner can be controlled or the strength of toner can be maintained, to the viscosity necessary for fixing can be realized within the above-described temperature range. When a sufficiently large viscosity change is obtained by the temperature change in the above-described range, the sharp-melt property and the low-temperature fixing property are satisfied and this is preferred.

In the resin particle for use in the present invention, assuming that the melting point of the resin particle is Tm, the storage modulus at Tm+20° C. is G'(Tm+20), and the storage modulus at Tm+50° C. is G'(Tm+50), the condition of the following formula (I) is satisfied:

$$|\log G'(Tm+20) - \log G'(Tm+50)| \leq 1.5 \quad (1)$$

This index indicates that the temperature dependency of the storage modulus after the melting point is low. More specifically, the resin particle in the resin particle liquid dispersion of the present invention expresses abrupt decrease in the elastic modulus at the melting point and thereafter, the elastic modulus is stabilized in a predetermined range, so that penetration into paper or offset can be prevented because even when the temperature is elevated at the fixing, the viscosity does not excessively decrease.

The viscoelasticity (storage modulus) can be obtained by shaping the resin particle into a tablet and measuring it with use of a rotary plate-type rheometer (RDA, 2RHIOS SYSTEM ver. 4.3.2, manufactured by Rheometric Scientific F.E. Ltd.) or the like.

The melting point of the resin particle usable in the present invention is preferably from 45 to 110° C., more preferably from 50 to 100° C., and most preferably from 55 to 90° C. The viscosity of the toner abruptly decreases on reaching the melting point and therefore, if the toner is stored in a temperature environment higher than the melting point, blocking occurs. Accordingly, the melting point of the toner is preferably higher than the lower temperature limit in a normal high-temperature environment to which the toner after storage or image formation is exposed, that is 45° C. or more. When the melting point is 110° C. or less, the toner can have an excellent low-temperature fixing property and this is preferred.

The melting point can be obtained as a melting peak temperature of the input compensation differential scanning calorimetry according to JIS K 7121:87. Incidentally, the crystalline resin sometimes has a plurality of melting peaks, but the maximum peak is regarded as the melting point.

<Polycondensable Monomer>

The polycondensable monomer which can be used in the present invention is not particularly limited and any polycondensable monomer may be used as long as it is used for various polymerization methods described later. The polycondensable monomer is described in detail below.

The polycondensable monomer which can be used in the present invention is not particularly limited if it is a substance of forming a crystalline polymer, and either a monomer of forming a crystalline polymer or a monomer of forming a non-crystalline polymer may be used, but a monomer of forming a crystalline polymer is preferred. Examples of the polycondensable monomer include those using an aliphatic, alicyclic or aromatic polyvalent carboxylic acid or an alkyl ester thereof, a polyhydric alcohol or an ester compound thereof, or a polyvalent amine. Such monomers can be directly polymerized by an esterification reaction, an transesterification reaction or the like.

The polyvalent carboxylic acid is a compound containing two or more carboxyl groups within one molecule. Out of these compounds, a dicarboxylic acid is a compound containing two carboxyl groups within one molecule and examples thereof include an oxalic acid, a succinic acid, a maleic acid, a malonic acid, a glutaric acid, an adipic acid, a β-methyladipic acid, an azelaic acid, a sebacic acid, a nonanedicarboxylic acid, a decanedicarboxylic acid, an undecanedicarboxylic acid, a dodecanedicarboxylic acid, a fumaric acid, a citraconic acid, an itaconic acid, a diglycolic acid, a cyclohexane-3,5-diene-1,2-carboxylic acid, a malic acid, a citric acid, a hexahydroterephthalic acid, a malonic acid, a pimelic acid, a tartaric acid, a mucic acid, a phthalic acid, an isophthalic acid, a terephthalic acid, a tetrachlorophthalic acid, a chlorophthalic acid, a nitrophthalic acid, a p-carboxyphenylacetic acid, a p-phenylenediacetic acid, an m-phenylenediglycolic acid, a p-phenylenediglycolic acid, an o-phenylenediglycolic acid, a diphenylacetic acid, a diphenyl-p,p'-dicarboxylic acid, a naphthalene-1,4-dicarboxylic acid, a naphthalene-1,5-dicarboxylic acid, a naphthalene-2,6-dicarboxylic acid and an anthracene dicarboxylic acid. Examples of the polyvalent carboxylic acid other than the dicarboxylic acid include a trimellitic acid, a trimesic acid, a pyromellitic acid, a naphthalenetricarboxylic acid, a naphthalenetetracarboxylic acid, a pyrenetricarboxylic acid and a pyrenetetracarboxylic acid.

Among these polyvalent carboxylic acids, preferred as the polycondensable monomer usable in the present invention are an azelaic acid, a sebacic acid, a 1,9-nonane-dicarboxylic acid, a 1,10-decanedicarboxylic acid, a 1,11-undecanedicarboxylic acid, a 1,12-dodecanedicarboxylic acid, a trimellitic acid and a pyromellitic acid. Since these polyvalent carboxylic acids are sparingly soluble or insoluble in water, the polycondensation reaction proceeds in an oil droplet formed by dispersing a polyvalent carboxylic acid in water and this is preferred.

The polyhydric alcohol (polyol) which can be used in the present invention is a compound having two or more hydroxyl groups within one molecule. Out of these compounds, the diol is a compound having two hydroxyl groups within one molecule and examples thereof include ethylene glycol, diethylene glycol, triethylene glycol, propylene glycol, butanediol, butenediol, neopentyl glycol, pentane glycol, hexanediol, cyclohexanediol, cyclohexanedimethanol, dipropylene glycol, octanediol, nonanediol, decanediol, dodecanediol, bisphenol A, bisphenol Z and hydrogenated bisphenol A. Examples of the polyol other than the diol include, but are not limited to, glycerin, pentaerythritol, hexamethylolmelamine, hexaethylolmelamine, tetramethylolbenzoguanamine and tetraethylolbenzoguanamine.

Among these polyols, preferred as the polyol usable in the present invention are diols such as 1,6-hexanediol, 1,8-octanediol, 1,9-nonanediol, 1,10-decanediol and 1,12-dodecanediol. Preferred examples of the polyol other than the divalent polyol include glycerin, pentaerythritol, hexahydroxymethylmelamine, hexahydroxyethylmelamine, tetrahydroxymethylbenzoguanamine and tetrahydroxyethylbenzoguanamine.

The polycondensation may also be performed by using a substance containing a carboxylic acid and a hydroxyl group within one molecule, and examples of such a substance include, but are not limited to, a hydroxyoctanoic acid, a hydroxynonanoic acid, a hydroxydecanoic acid, a hydroxyundecanoic acid, a hydroxydodecanoic acid, a hydroxytetradecanoic acid, a hydroxytridecanoic acid, a hydroxyhexadecanoic acid, a hydroxypentadecanoic acid and a hydroxystearic acid.

By the combination of these polycondensable monomers, a non-crystalline resin or a crystalline resin can be easily obtained, but a crystalline polymer or a crystalline polyamide is preferred, and a crystalline polyester is more preferred.

Among such crystalline polyesters, in view of suitability for a toner, preferred are a combination of hexanediol with an acid selected from an adipic acid, a sebacic acid and a 1,10-decanedicarboxylic acid (dodecane diacid), a combination of octanediol with an acid selected from an adipic acid and a sebacic acid, a combination of octanediol with an acid selected from an adipic acid and a sebacic acid, and a combination of nonanediol with an adipic acid, a sebacic acid or a 1,10-decanedicarboxylic acid (dodecane diacid).

Examples of the polyamine used for obtaining a polyamide include ethylenediamine, diethylenediamine, triethylenediamine, 1,2-propanediamine, 1,3-propanediamine, 1,4-butanediamine, 1,4-butenediamine, 2,2-dimethyl-1,3-butanediamine, 1,5-pentanediamine, 1,6-hexanediamine, 1,4-cyclohexanediamine and 1,4-cyclohexanebis(methylamine).

By the combination of these polyamines, a non-crystalline resin or a crystalline resin can also be easily obtained, but a crystalline resin is preferred.

Examples of the polycondensation catalyst which can be used in the present invention include a surfactant-type catalyst, a metal catalyst and a hydrolase-type catalyst.

The surfactant-type catalyst includes, for example, a strong acid having a surface activating effect, and examples of the strong acid which can be used include, but are not limited to, an alkylbenzenesulfonic acid such as dodecylbenzenesulfonic acid, isopropylbenzenesulfonic acid, comphorsulfonic acid and para-toluenesulfonic acid, an alkylsulfonic acid, an alkyldisulfonic acid, an alkylphenolsulfonic acid, an alkylnaphthalenesulfonic acid, an alkyltetralinsulfonic acid, an alkylallylsulfonic acid, a petroleum sulfonic acid, an alkylbenzimidazolesulfonic acid, a higher alcohol ether sulfonic acid, an alkyldiphenylsulfonic acid, a long-chain alkylsulfuric acid ester such as monobutyl-phenylphenol sulfate, dibutyl-phenylphenol sulfate and dodecyl sulfate, a higher alcohol sulfuric acid ester, a higher alcohol ether sulfuric acid ester, a higher fatty acid amide alkylol sulfuric acid ester, a higher fatty acid amide alkylated sulfuric acid ester, a naphthenyl alcohol sulfuric acid, a sulfated fat, a sulfosuccinic acid ester, various fatty acids, a sulfonated higher fatty acid, a higher alkylphosphoric acid ester, a resin acid, a resin acid alcohol sulfuric acid, a naphthenic acid, a niobic acid, and salt compounds of all of these acids, such as a salt compound with a rare earth metal described below. A plurality of these acids and compounds may be used in combination, if desired. Among these surfactant-type catalysts, preferred are a dodecylbenzenesulfonic acid, an isopropylbenzenesulfonic acid and a comphorsulfonic acid.

Examples of the metal catalyst include, but are not limited to, an organic tin compound, an organic titanium compound, an organic tin halide compound and a rare earth metal catalyst. As for the rare earth-containing catalyst, specifically, those containing an element such as scandium (Sc), yttrium (Y), lanthanum (La) as lanthanide element, cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu) are effective. In particular, those having an alkylbenzenesulfonate, alkylsulfuric acid ester salt or triflate structure are effective. Among these structures, a triflate structure is preferred. As for the triflate, examples of the structural formula include $X(OSO_2CF_3)_3$. X is a rare earth element and preferably scandium (Sc), yttrium (Y), ytterbium (Yb) or samarium (Sm).

The lanthanide triflate is described in detail, for example, in *Journal of Synthetic Organic Chemistry, Japan*, Vol. 53, No. 5, pp. 44-54.

The hydrolase-type catalyst is not particularly limited as long as it catalyzes an ester synthesis reaction. Examples of the hydrolase which can be used in the present invention include an esterase classified into EC (enzyme code) group 3.1 (see, for example, Maruo and Tamiya (supervisors), *Koso Handbook (Handbook of Enzyme)*, Asakura Shoten (1982)) such as carboxyesterase, lipase, phospholipase, acetylesterase, pectinesterase, cholesterol esterase, tannase, monoacylglycerol lipase, lactonase and lipoprotein lipase; a hydrolase classified into EC group 3.2 having activity on a glycosyl compound, such as glucosidase, galactosidase, glucuronidase and xylosidase; a hydrolase classified into EC group 3.3 such as epoxide hydrase; a hydrolase classified into EC group 3.4 having activity on a peptide bond, such as aminopeptidase, chymotrypsin, trypsin, plasmin and subtilisin; and a hydrolase classified into EC group 3.7 such as phloretin hydrase.

Among those esterases, an enzyme of hydrolyzing a glycerol ester and isolating a fatty acid is called a lipase. The lipase is advantageous in that, for example, this enzyme shows high stability in an organic solvent, catalyzes an ester synthesis reaction with good efficiency and is inexpensive. Accordingly, from the aspect of yield and cost, a lipase is preferably used also in the production process of a polyester of the present invention.

Lipases of various origins may be used but preferred examples thereof include a lipase obtained from microorganisms of *Pseudomonas* group, *Alcaligenes* group, *Achromobacter* group, *Candida* group, *Aspergillus* group, *Rizopus* group and *Mucor* group, a lipase obtained from plant seeds and a lipase obtained from animal tissues, and further include pancreatin and steapsin. Among these, preferred is a lipase originated in microorganisms of *Pseudomonas* group, *Candida* group and *Aspergillus* group.

In order to achieve polycondensation at a lower temperature, out of those catalysts, a surfactant-type catalyst, a rare earth element catalyst and an enzyme catalyst are effective. As for the rare earth metal catalyst, a catalyst comprising particularly Y, Sc, Yb, Sm or the like as the constituent component is preferred. It is important to select a polycondensation catalyst having higher hydrophobicity or a larger molecular weight by keeping in mind that the catalyst is dispensed to an emulsion or particle containing polycondensable monomers undergoing polymerization and an aqueous medium. A surfactant-type catalyst is preferably selected.

At this time, one catalyst or a plurality of catalysts can be added in an amount of 0.1 to 100,000 ppm, preferably from 0.5 to 80,000 ppm, more preferably from 0.5 to 70,000 ppm, based on the polycondensable monomers.

The polycondensation catalyst may be added either to an aqueous phase or to an oil phase but is preferably added to an aqueous phase. Particularly, in the miniemulsion polymerization method, the catalyst is preferably added to an aqueous phase.

<Radical Polymerizable Monomer>

In the present invention, a radical polymerizable monomer may be blended together with the polycondensable monomers and radical-polymerized in a miniemulsion. This combination is preferred in view of production of a toner resin as well as from the standpoint of maintaining the properties of the toner resin. As for the radical polymerizable monomer, one of the following substances may be used alone or a plurality of these substances may be used in combination, but the present invention is not limited to those described below.

The radical polymerizable monomer which can be used in the present invention is preferably, for example, a compound having an ethylenically unsaturated bond, more preferably a vinyl-based monomer or an olefin-based monomer.

Specific examples of the vinyl-based monomer include vinyl aromatics such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene p-n-octylstyrene, p-n-nonylstyrene, p-n-decylstyrene, p-n-dodecylstyrene, p-methoxystyrene and p-phenylstyrene; unsaturated carboxylic acids such as (meth)acrylic acid (the term "(meth)acryl" indicates acryl and methacryl; hereinafter the same), crotonic acid, maleic acid, fumaric acid, citraconic acid and itaconic acid; unsaturated carboxylic acid esters such as methyl(meth)acrylate, ethyl(meth)acrylate, propyl(meth)acrylate, butyl(meth)acrylate, pentyl(meth)acrylate, hexyl(meth)acrylate, 2-ethylhexyl(meth)acrylate, glycidyl(meth)acrylate and benzyl (meth)acrylate; unsaturated carboxylic acid derivatives such as (meth)acrylaldehyde, (meth)acrylonitrile and (meth)acrylamide; N-vinyl compounds such as N-vinylpyridine and N-vinylpyrrolidone; vinyl esters such as vinyl formate, vinyl acetate and vinyl propionate; vinyl halide compounds such as vinyl chloride, vinyl bromide and vinylidene chloride; N-substituted unsaturated amides such as N-methylolacrylamide, N-ethylolacrylamide, N-propanolacrylamide, N-methylolmaleinamic acid, N-methylolmaleinamic acid ester, N-methylolmaleimide and N-ethylolmaleimide; conjugated dienes such as butadiene and isoprene; polyfunctional vinyl compounds such as divinylbenzene, divinylnaphthalene and divinylcyclohexane; and polyfunctional acrylates such as ethylene glycol di(meth)acrylate, diethylene glycol di(meth)acrylate, propylene glycol di(meth)acrylate, tetramethylene glycol di(meth)acrylate, neopentyl glycol di(meth)acrylate, hexamethylene glycol di(meth)acrylate, trimethylol propane di(meth)acrylate, trimethylol propane tri(meth)acrylate, glycerol di(meth)acrylate, glycerol tri(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra(meth)acrylate, dipentaerythritol penta(meth)acrylate, dipentaerythritol hexa(meth)acrylate, sorbitol tri(meth)acrylate, sorbitol tetra(meth)acrylate, sorbitol penta(meth)acrylate and sorbitol hexa(meth)acrylate, Among these, N-substituted unsaturated amides, conjugated dienes, polyfunctional vinyl compounds and polyfunctional acrylates can bring about a crosslinking reaction in the produced polymer.

Examples of the olefin-based monomer include ethylene, propylene, isobutylene, 1-butene, 1-pentene and 4-methyl-1-pentene. Examples of the diolefin-based monomer include butadiene, isoprene and chloroprene. Among the radical polymerizable monomers described above, preferred as the resin are vinyl aromatics and carboxylic acid esters.

The radical polymerizable monomer which can be used in the present invention preferably contains a radical polymerizable monomer having a hydrophilic group. The hydrophilic group includes, for example, a polar group and examples thereof include, but are not limited to, an acidic polar group such as carboxyl group, sulfone group, a phosphoric acid group and a formyl group; a basic polar group such as amino group; and a neutral polar group such as amide group, hydroxyl group and cyano group. Among these, an acidic polar group is preferably used in the toner. When a radical polymerizable monomer having this polar group is present on the resin particle surface in a certain specific range, this is preferred because an aggregating property is imparted to the resin particle to enable the production of a toner from the resin particles and the toner can have a sufficiently high electricity.

The acidic group is preferably a carboxyl group or a sulfone group. Examples of the monomer having such an acidic group include an α,β-ethylenically unsaturated compound having a carboxyl group, and an α,β-ethylenically unsaturated compound having a sulfone group. Examples of the α,β-ethylenically unsaturated compound having a carboxyl group include an acrylic acid, a methacrylic acid, a fumaric acid, a maleic acid, an itaconic acid, a cinnamic acid, a monomethyl maleate, a monobutyl maleate and a monooctyl maleate, and examples of the α,β-ethylenically unsaturated compound having a sulfone group include a sulfonated ethylene, an Na salt thereof, an allylsulfosuccinic acid and an octyl allylsulfosuccinate. Among these, an α,β-ethylenically unsaturated compound having a carboxyl group is preferred. One of these monomers may be used alone or two or more thereof may be used in combination.

The radical polymerizable monomer used in combination is preferably blended in an amount of 3 to 300 wt %, more preferably from 5 to 200 wt %, based on the polycondensable monomers.

In the production of the resin particle for use in the present invention, in addition to the polycondensable monomers and the radical polymerizable monomer, another polymerizable monomer which can be polymerized in an aqueous medium, may also be added within the range of not impairing the properties necessary for the use end such as resin particle liquid dispersion, toner or image.

Furthermore, in the present invention, a co-surfactant is preferably used in an amount of 0.1 to 40 wt % based on the polycondensable monomers. The co-surfactant is added to reduce the Ostwald ripening (Ostwald growth) in the so-called miniemulsion polymerization. As for the co-surfactant, those generally known as a co-surfactant in the miniemulsion process may be used. Examples thereof include, but are not limited to, alkanes having a carbon number of 8 to 30, such as dodecane, hexadecane and octadecane; alkyl alcohols having a carbon number of 8 to 30, such as lauryl alcohol, cetyl alcohol and stearyl alcohol; alkanethiols having a carbon number of 8 to 30, such as dodecanethiol, lauryl mercaptan, cetyl mercaptan and stearyl mercaptan; a polymer thereof with acrylic acid esters or methacrylic acid esters; a polymer or polyadducts, such as polystyrene and polyester; carboxylic acids; ketones; and amines.

Among these co-surfactants, preferred are hexadecane, cetyl alcohol, dodecanethiol, stearyl methacrylate, lauryl methacrylate, polyester and polystyrene, and for the purpose of avoiding the generation of a volatile organic substance, more preferred are stearyl methacrylate, lauryl methacrylate, polyester and polystyrene.

The polymer or polymer-containing composition usable for the co-surfactant may contain, for example, a copolymer, block copolymer or mixture with another monomer. Also, a plurality of co-surfactants may be used in combination.

It is also important that the resin particle liquid dispersion is free from generation of ultrafine powder or ultra-coarse powder. In this light, the percentage of particles having a median diameter of 0.01 μm or less or a median diameter of 5.0 μm or more (hereinafter sometimes referred to as a "large/small particle overall percentage") is preferably 10% or less, more preferably 5% or less.

The median diameter of the resin particle can be measured, for example, by a laser diffraction-type particle size distribution measuring device (LA-920, manufactured by Horiba Ltd.).

In the polycondensable polymer produced in the present invention, the weight average molecular weight of the polycondensable polymer particle for toner is suitably from 1,500 to 60,000, preferably from 3,000 to 40,000. When the weight average molecular weight is in this range, sufficiently high cohesive force as the binder resin and good hot offset resistance are obtained and the lowest fixing temperature is advantageously not elevated.

In the resin produced by using the above-described radical polymerizable monomer, in view of fixing property and image forming property, the glass transition temperature Tg as the resin for toner is preferably from 40 to 100° C. When the Tg is in this range, the cohesive force of the binder resin itself is not decreased in the high-temperature region and hot offset scarcely occurs at the fixing. Also, the lowest fixing temperature is not elevated and this is preferred. The glass transition temperature is more preferably from 50 to 80° C., and most preferably from 50 to 70° C.

As for the polymerization method of the radical polymerizable monomer, a known polymerization method such as a method using a radical polymerization initiator, a self-polymerization method under heat, and a method using ultraviolet irradiation may be employed. In the method using a radical initiator, the radical polymerization initiator may be either an oil-soluble initiator or a water-soluble initiator.

Examples of the radical polymerization initiator include ammonium persulfate, potassium persulfate, sodium persulfate, 2,2'-azobis(2-methylpropionamido)dihydrochloride, tert-butylperoxy-2-ethylhexanoate, cumyl perpivalate, tert-butylperoxylaurate, benzoyl peroxide, lauroyl peroxide, octanoyl peroxide, di-tert-butyl peroxide, tert-butylcumyl peroxide, dicumyl peroxide, 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1-bis(tert-butylperoxy)-3,3,5-trimethylcyclohexane, 1,1-bis(tert-butylperoxy)cyclohexane, 1,4-bis(tert-butylperoxycarbonyl)cyclohexane, 2,2-bis(tert-butylperoxy)octane, n-butyl-4,4-bis(tert-butylperoxy)valylate, 2,2-bis(tert-butylperoxy)butane, 1,3-bis(tert-butylperoxyisopropyl)benzene, 2,5-dimethyl-2,5-di(tert-butylperoxy)hexane, 2,5-dimethyl-2,5-di(tert-butylperoxy)hexane, 2,5-dimethyl-2,5-di(benzoylperoxy)hexane, di-tert-butyldiperoxy isophthalate, 2,2-bis(4,4-di-tert-butylperoxycyclohexyl)propane, di-tert-butylperoxy α-methylsuccinate, di-tert-butylperoxy dimethylglutarate, di-tert-butylperoxy hexahydroterephthalate, di-tert-butylperoxy azelate, 2,5-dimethyl-2,5-di(tert-butylperoxy)hexane, diethylene glycol-bis(tert-butylperoxycarbonate), di-tert-butylperoxy trimethyladipate, tris(tert-butylperoxy)triazine, vinyltris(tert-butylperoxy)silane, 2,2'-azobis(2-methylpropionamidinedihydrochloride), 2,2'-azobis[N-(2-carboxyethyl)-2-methyl-propionamidine] and 4,4'-azobis(4-cyanovaleric acid).

In the case where the resin particle contains a radical polymerizable polymer, the weight average molecular weight of the radical polymerizable polymer is preferably from 5,000 to 200,000, more preferably from 8,000 to 100,000.

In the present invention, the dispersion medium of the resin particle liquid dispersion for an electrostatic image developing toner is an aqueous medium.

Examples of the aqueous medium which can be used in the present invention include water such as distilled water and ion exchanged water, and alcohols such as ethanol and methanol. Among these, ethanol and water are preferred, and water such as distilled water and ion exchanged water is more preferred. One of these aqueous mediums may be used alone or two or more thereof may be used in combination.

Also, the aqueous medium may contain a water-miscible organic solvent. Examples of the water-miscible organic solvent include acetone and acetic acid.

In the resin particle liquid dispersion of the present invention, the resin particle having a viscoelasticity, a melting point and a particle diameter suitable for an electrostatic image developing toner may also be produced by combining the following techniques in a composite manner. For example, it is more preferred to combine multiple factors such as introduction of a crosslinked structure between the polycondensable monomer and another polymerizable monomer, introduction of a urethane bond, introduction of a carbodiimide group, control of the molecular weight of the polycondensable polymer, introduction of an ionomer, introduction of a graft bond, the compositional ratio between the polycondensable polymer and another polymerizable polymer, and a resin particle-cooling method.

In one appropriate method, an unsaturated bond-containing monomer which is a polycondensable monomer capable of forming a crosslinked structure with a radical polymerizable polymer is mixed as a polycondensable monomer, and a crosslinked structure is introduced between the polycondensable polymer and the radical polymerizable polymer through a polycondensation reaction and a radical polymerization reaction in an aqueous medium. In this case, the unsaturated bond-containing monomer (crosslinking agent) is preferably blended at a proportion of 20 to 50 wt % based on all monomers. When the crosslinking agent content is 20 wt % or more, the viscoelasticity does not decrease particularly at ordinary temperature, and when it is 50 wt % or less, the number of crosslinking points in the resin is not excessively large and this is preferred because the properties of the crystalline resin can be fully exerted. Incidentally, the term "all monomers" indicates all monomers (for example, the polycondensable monomer, the radical polymerizable monomer and the unsaturated bond-containing monomer) constituting the resin particle.

The thus-formed resin particle where a polycondensable polymer and a radical polymerizable polymer are crosslinked can have low-temperature fixing property of the polycondensable polymer, excellent offset resistance of the radical polymerizable polymer, and strength at ordinary temperature.

The unsaturated bond-containing monomer (crosslinking agent) is preferably, for example, an unsaturated bond-containing carboxylic acid or an acid anhydride or lower ester thereof, more preferably an unsaturated dicarboxylic acid or an acid anhydride or lower ester thereof. Specific preferred examples of the unsaturated dicarboxylic acid include, but are not limited to, a fumaric acid, a maleic acid, a citraconic acid, an alkenylsuccinic acid, an itaconic acid, a mesaconic acid, a dimethylmaleic acid and dimethylfumaric acid. Among these, a maleic acid, a fumaric acid, and a monoester thereof are preferred. Incidentally, the lower ester means an ester with an aliphatic alcohol having a carbon number of 1 to 8. Also, the monoester is, for example, a maleic acid monoesterified with an aliphatic alcohol having a carbon number of 1 to 8, and specific examples thereof include monomethyl maleate, monoethyl maleate, monopropyl maleate, monobutyl maleate, monopentyl maleate and monohexyl maleate.

The crosslinking method, the crosslinking agent and the polymer component used for the crosslinking with the polycondensable polymer are not particularly limited and are appropriately selected.

In order to cause the resin particle liquid dispersion of the present invention to achieve desired properties by the molecular weight of the polycondensable polymer, the resin particle for use in the present invention has a number average molecular weight Mn of 2,000 to 20,000 and a weight average molecular weight Mw of 4,000 to 100,000, preferably Mn of 2,500 to 10,000 and Mn of 4,500 to 50,000, more preferably Mn of 3,000 to 10,000 and Mw of 5,000 to 40,000. The polycondensable polymer having a molecular weight in this range can be obtained by introducing a urethane bond or a carbodiimide group to extend the molecular chain or by accelerating the reaction with use of another chain extending agent, a dehydrating agent or the like.

With respect to the introduction of a urethane bond, examples of the resin include an addition reaction product of polyol and isocyanate, a reaction product of polyester having a hydroxyl group and polyisocyanate, and a reaction product of polyester, polyisocyanate and polyol. The polyester having a hydroxyl group is preferably, for example, a polycondensate of polycarboxylic acid and polyol, which is excessive in the hydroxyl group equivalent number. The polyisocyanate as used herein means a compound having a plurality of isocyanate groups, and a polyisocyanate having 1.5 or more isocyanate groups on average within one molecule is preferably contained at a proportion of 20.0 to 90.0 wt % based on all monomers. When the percentage of this polyisocyanate is 20.0 wt % or more, the effect of extending the chain in an aqueous medium is sufficiently high and a necessary viscoelasticity is obtained, and when the percentage is 90.0 wt % or less, the oil droplet is prevented from excessive elevation of the hydrophilicity and can easily maintain the stability and this is preferred. The percentage of this polyisocyanate is more preferably from 20.0 to 50.0 wt %.

Examples of the polyisocyanate include an aliphatic polyisocyanate (e.g., tetramethylene diisocyanate, hexamethylene diisocyanate, 2,6-diisocyanatomethyl caproate); an alicyclic polyisocyanate (e.g., isophorone diisocyanate, cyclohexylmethane diisocyanate); an aromatic polyisocyanate (e.g., tolylene diisocyanate, diphenylmethane diisocyanate); an aromatic aliphatic polyisocyanate (e.g., $\alpha,\alpha',\alpha'$-tetramethylxylylene diisocyanate); isocyanurates; a polyisocyanate obtained by blocking the above-described polyisocyanate with a phenol derivative, oxime, caprolactam or the like; and a combination of two or more of these polyisocyanates.

As for the dehydrating agent for use in the present invention, a generally usable dehydrating agent or water-absorbing agent is used to coexist at the polycondensation reaction in water, whereby the polymerization reaction can be accelerated.

With respect to the introduction of a carbodiimide group, the carbodiimide group is characterized in that a carbamoylamide bond or an isourea bond is formed by the reaction with a carboxyl group or a hydroxyl group in a polyester resin or the like and moreover, the reaction proceeds even in the presence of water. Therefore, the effect of increasing the molecular weight by grafting or crosslinking of the polycondensation resin such as polyester is high and the mechanical strength as a toner can be enhanced. The carbodiimide compound for use in the present invention has a carbodiimide group within the molecule and forms a carbamoylamide bond by the reaction with a carboxyl group of a polyester resin or forms a isourea bond by the reaction with a hydroxyl group of a polyester resin. Examples of the polycarbodiimide resin obtained from these raw materials include poly(tert-butylcarbodiimide), polytetramethylxylylene carbodiimide, poly(2,4-toluoylenecarbodiimide), poly(2,6-toluoylenecarbodiimide), poly(o-toldinecarbodiimide), poly(4,4'-diphenylmethanecarbodiimide), poly(4,4'-dicyclohexylmethanecarbodiimide), poly(4,4'-diphenylethercarbodiimide), poly(3,3'-dimethoxy-4,4'-diphenylcarbodiimide), poly(p-phenylenecarbodiimide), poly(naphthylene-1,5-carbodiimide), poly(m-xylylenecarbodiimide), poly-hydrogenated xylylene carbodiimide, poly-hexamethylene carbodiimide, poly-trimethylhexamethylene carbodiimide and polyisophorone carbodiimide.

As for the generally available commercial product, Carbodilite E Series (emulsion type), V Series (aqueous type) or the like, produced by Nisshinbo Industries, Inc., are usable.

With respect to the introduction of an ionomer into the polycondensable polymer, this can be realized by neutralizing a part, preferably from 20 to 80%, of the carboxyl group contained in the polycondensable polymer with a metal salt containing, for example, zinc, cobalt, nickel, aluminum or copper(II). Examples of the polyvalent metal compound suitably used at the formation of an ion crosslinked structure by the coordination bonding (ionic bonding) with the above-described carboxyl group include an acetate and an oxide of alkaline earth metal or zinc group metal. Furthermore, as for the method of introducing an ionomer resin into the toner in the production process of a toner of the present invention, which is described later, a method of incorporating an ionomer resin into the toner by performing aggregation after adding an ionomer resin liquid dispersion in the aggregation step may be used. The metal salt of the polyester-containing polymer obtained by the polycondensation in an aqueous medium may be formed, for example, by dissolving the polymer in an organic solvent, adding a metal compound, and stirring and mixing the solution, if desired, under heating and in this case, a uniform ionomer resin can be obtained. Also, an ionomer may be incorporated into the toner by adding, in the aggregation step, a resin particle liquid dispersion having dispersed therein a resin prepared by melt-mixing a polyester resin and an ionomer resin.

In addition, for example, a combination use of a crystalline polycondensable polymer and a non-crystalline radical polymerizable polymer, or a combination use of a crystalline polycondensable polymer and a non-crystalline polycondensable polymer may be preferably employed.

In the case of using a crystalline polycondensable polymer and a non-crystalline radical polymerizable polymer in combination, the compositional ratio is preferably from 4:6 to 0.5:9.5, more preferably from 4.5:5.5 to 1.0:9.0, in terms of the weight ratio between the crystalline polycondensable polymer and the non-crystalline radical polymerizable polymer.

In the case of using a crystalline polycondensable polymer and a non-crystalline polycondensable polymer in combination, examples of the method therefor include a method of mixing these polycondensable polymers, forming particles therefrom, and producing a liquid dispersion, and a method of causing one polycondensable polymer to coexist when another polycondensable polymer is polycondensed in an aqueous medium. The mixing ratio can be appropriately selected according to the kind of the monomers.

When the above-described method is used alone, this provides effects such as three-dimensional configuration of polymer, increase of molecular weight, introduction of metal ion, control of crystallinity and balancing between crystalline polymer and non-crystalline polymer. However, when this method is combined with an appropriate technique, a resin having low-temperature fixing property, sharp-melt property and offset resistance can be produced in an aqueous medium.

The resin particle for use in the present invention preferably has an acid value of 1 to 50 mgKOH/g. A first reason therefor is because the control of particle diameter and particle diameter distribution of a toner in an aqueous medium is indispensable for use in practice as a toner assured of high image quality and when the acid value is 1 mgKOH/g or more, a satisfactory particle diameter and a satisfactory particle diameter distribution are achieved and also in view of electricity of the toner, a sufficiently high electricity can be obtained. Furthermore, when the acid value is 50 mgKOH/g or less, a molecular weight sufficiently large to ensure an image quality strength as a toner at the polycondensation can be obtained and also, excellent image reliability with less environmental dependency of the electricity of toner at a high humidity is advantageously obtained.

(Production Process of Resin Particle Liquid Dispersion for Electrostatic Image Developing Toner)

The production process of a resin particle liquid dispersion for an electrostatic image developing toner of the present invention comprises a step of preparing an emulsified liquid dispersion comprising an aqueous medium having emulsion-dispersed therein an oil phase containing at least polycondensable monomers (hereinafter sometimes referred to as an "emulsion-dispersion step"), and a step of polycondensing the polycondensable monomers (hereinafter sometimes referred to as a "polycondensation step").

The production process of a resin particle liquid dispersion is described below.

The production process of a resin particle liquid dispersion of the present invention comprises a step of preparing an emulsified liquid dispersion comprising an aqueous medium having emulsion-dispersed therein an oil phase containing at least polycondensable monomers.

Here, for forming a particle emulsion, for example, a monomer solution (oil phase) having added thereto a co-surfactant and an aqueous surfactant solution (aqueous phase) are uniformly mixed and emulsified in a shear mixing apparatus such as piston homogenizer, microfluidizing device (for example, "Microfluidizer" manufactured by Microfluidics) and ultrasonic disperser. At this time, the amount of the oil phase charged into the aqueous phase is preferably on the order of 0.1 to 50 wt % based on the total amount of the aqueous phase and the oil phase. The amount of the surfactant used is preferably less than the critical micelle concentration (CMC) in the presence of the emulsion formed. Also, the amount of the co-surfactant used is preferably from 0.1 to 40 parts by weight, more preferably from 0.1 to 20 parts by weight, per 100 parts by weight of the oil phase.

Incidentally, a "miniemulsion polymerization method" which is a method of polymerizing monomers by using a surfactant in an amount less than the critical micelle concentration (CMC) and a co-surfactant in combination in the presence of a polymerization initiator for the monomer emulsion is preferred, because, as described above, monomers are polymerized in a monomer particle (oil droplet) and therefore, uniform polymer particles are formed. Furthermore, the "miniemulsion polymerization method" is advantageous in that since diffusion of the monomer is not required in the polymerization process, the polymer can be present as it is in the polymer particle.

Also, so-called "microemulsion polymerization" of producing particles having a particle diameter of 5 to 50 nm described, for example, in J. S. Guo, M. S. El-Aasser, and J. W. Vanderhoff, *J. Appl. Polym. Sci.: Polym. Chem. Ed.*, Vol. 27, page 691 (1989) has a dispersion structure and a polymerization mechanism similar to the "miniemulsion polymerization" as referred to in the present invention and can be used also in the present invention. In the "microemulsion polymerization", a surfactant higher than the critical micelle concentration (CMC) is used in a large amount and there may arise a problem, for example, a large amount of a surfactant is mixed in the obtained polymer particle or a huge time is necessary for the step of removing the surfactant, such as water washing, acid washing or alkali washing.

The production process of a resin particle liquid dispersion of the present invention comprises a step of polycondensing the polycondensable monomers in an aqueous medium.

In the present invention, monomers are previously dispersed in an aqueous medium where if desired, a surfactant, a co-surfactant and the like are dissolved in a small amount, by using mechanical shear force, ultrasonic wave or the like, and the dispersion is then heated to effect polycondensation. Alternatively, monomers are dissolved in another medium to prepare an oil phase where if desired, a surfactant, a co-surfactant and the like are further dissolved, the oil phase is dispersed in the above-described aqueous medium, and the dispersion is then heated to effect polycondensation. As for the polymerization method in this case, an ordinary heterogeneous polymerization mode in an aqueous medium, such as suspension-polymerization method, miniemulsion method, microemulsion method, multi-step swelling method, emulsion-polymerization method containing seed polymerization, and extension reaction method using a resin (e.g., urethane), may be utilized as the polymerization method of particles in an aqueous medium. Among these polymerization methods, from the standpoint that a uniform particle diameter and a regulated particle diameter distribution are readily obtained, a microemulsion method and a miniemulsion polymerization method are preferred, and a miniemulsion polymerization method is most preferred.

The polycondensation reaction in an aqueous medium depends on the stability and viscosity of the oil droplet formed in the aqueous medium and since the polycondensation takes place on the oil droplet surface, this reaction is established on the basis of balance among the polycondensation reaction on the oil droplet surface, the drag-in of reactant into the oil droplet, and the bleed-out of unreacted material to the oil droplet surface. If this balance is lost, the stability of oil droplet or the progress of polycondensation may be inhibited.

The resin particles dispersed in the resin particle liquid dispersion are preferably polycondensed in an aqueous medium at a polycondensation temperature Tc in the range of $(Tm-20° C.)<Tc<(Tm+20° C.)$ wherein Tm is the melting point of the resin particle. The polycondensation temperature is preferably higher than $(Tm-20° C.)$, because the viscosity of the polymer produced is not excessively elevated and this allows for easy movement of the polymer produced on the surface of an oil droplet dispersed in an aqueous medium, as a result, an unreacted monomer is present on the oil droplet surface with high probability and the polycondensation can satisfactorily proceed. On the other hand, the reaction temperature is preferably lower than $(Tm+20° C.)$, because the viscosity of the polycondensable polymer does not excessively decrease and this ensures good stability of the oil droplet as well as less occurrence of the drag-in of an insufficiently polycondensed polycondensable polymer into the oil droplet.

In the polycondensation step of the present invention, assuming that the highest temperature out of melting points of the polycondensable monomers forming a polycondensation resin is Th, the polycondensation is preferably performed at a polycondensation temperature Tc of $45° C.<Tc<Th$ in an aqueous medium. The polycondensation temperature preferably exceeds 45° C., because the catalyst exhibits good activity and the polycondensation satisfactorily proceeds. On the other hand, the polycondensation temperature is preferably less than Th, because the polycondensable monomer is not entirely melted and the oil droplet is assured of good stability with less occurrence of the positional exchange between a polymer and a monomer before polycondensation satisfactorily proceeds.

The production process of a resin particle liquid dispersion of the present invention may comprise a step of rapidly cooling the resin particle liquid dispersion to a temperature of −10° C. or more and Tc−60° C. or less (hereinafter sometimes referred to as a "cooling step") after the polycondensation step. In the case where a polymerization step described later is performed after the polycondensation step, the cooling step is preferably performed after the polymerization step.

As for the cooling method, a method of rapidly cooling the resin particle liquid dispersion to a temperature of −10° C. or more and Tc−60° C. or less after a miniemulsion polymerization reaction including polycondensation is preferred. By rapidly cooling the resin particle liquid dispersion produced at the above-described polycondensation temperature or the resin particle liquid dispersion produced by subsequently passing through other reactions such as radical polymerization, the composition in the resin particle can be uniformly dispersed and fixed and furthermore, aggregation of particles with each other can be suppressed, as a result, a resin particle liquid dispersion with high quality and good liquid dispersion stability can be obtained. The cooling rate is not particularly limited but is preferably 2° C./min or more, more preferably from 3 to 20° C./min. When the cooling rate is in this range, the particle diameter of the resin particle is not increased and the liquid dispersion is advantageously assured of good stability. The cooling may be performed, for example, by a method using a cooling medium such as ice or a method using cold blast or the like, or by using a heat exchanger or the like.

The production process of a resin particle liquid dispersion of the present invention may comprise a step of polymerizing a radical polymerizable monomer (hereinafter sometimes referred to as a "radical polymerization step" or simply a "polymerization step").

In the polymerization step of the present invention, similarly to the polycondensation step, a plurality of polymerizations may be performed simultaneously or successively. For example, a radical polymerizable monomer as a monomer component of undergoing the polymerization is mixed together with the polycondensation monomers, and the radical polymerization may be performed simultaneously with the polycondensation reaction or after the polycondensation, or inversely, the polycondensation may be performed after the radical polymerization. At this time, a polycondensation catalyst may be mixed in the monomer component. As for the radical polymerization catalyst, a radical initiator may be added to the monomer mixture or aqueous medium before, during or after the polycondensation.

Also, a chain transfer agent may be used at the radical polymerization. The chain transfer agent is not particularly limited but a compound having a thiol component may be used. Specifically, alkanethiols such as hexanethiol, heptanethiol, octanethiol, nonanethiol, decanethiol and dodecanethiol are preferred. Use of a chain transfer agent is advantageous particularly in that the molecular weight distribution can be made narrow and therefore, the toner can have good storability at high temperatures.

At the polymerization in an aqueous medium of the present invention, the monomer components before polycondensation may be previously mixed with a colorant, a fixing aid such as wax, and other components generally required in the polymerization reaction as well as in the production of toner, such as electrification aid, dehydrating agent, water-absorbing agent and chain extending agent.

In the present invention, the polymerization step and/or the polycondensation step may contain a polymerization reaction of the above-described monomers with a prepolymer which has been previously prepared. The prepolymer is not limited as long as it is a polymer capable of being dissolved or uniformly mixed in the monomers, and may further contain, for example, a homopolymer of the above-described monomer, a copolymer comprising a combination of two or more monomers containing the above-described monomer, or a mixture or graft polymer thereof.

In the present invention, in the case of polymerizing polycondensable monomers and a radical polymerizable monomer, the radical polymerizable monomer may be previously mixed with the polycondensation monomers at the step of polymerization or polycondensation in an aqueous medium, so that a hybrid particle comprising a polymer of those monomers can be finally obtained through polycondensation and radical polymerization.

Furthermore, in the polycondensation step, it is also possible to previously form a polymer having a low molecular weight by a block polymerization method or a solution polymerization method, emulsify or disperse the polymer in an aqueous medium and perform a polycondensation reaction to reach the final molecular weight. Also in this case, the emulsion-dispersion may be performed after the radical polymerizable monomer is mixed with a low molecular weight polyester or with a low molecular weight polyester and polycondensable polymers. In the polycondensation in an aqueous medium of the present invention, the acid value of the polymerized polymer affects the final molecular weight or the polymerization speed and therefore, it is preferred in view of production to use a method of causing, for example, a radical polymerizable vinyl monomer having low solubility in water to coexist during polycondensation, a method of previously adjusting the acid value of a polyester monomer to a lower state by preparing a low molecular weight form (or a medium molecular weight form) in the level of not causing a problem in the emulsion-dispersion, and then obtaining a final high molecular form in an aqueous medium, or a combination of these two methods, that is, a method of performing both preliminary polymerizations of a radical polymerizable monomer and a polyester.

(Production Process of Electrostatic Image Developing Toner)

The production process of an electrostatic image developing toner (hereinafter sometimes simply referred to as a "toner") of the present invention is a method for producing an electrostatic image developing toner, comprising a step (hereinafter sometimes referred to as an "aggregation step") of aggregating resin particles in a liquid dispersion containing at least a resin particle liquid dispersion to obtain aggregate particles, and a step (hereinafter sometimes referred to as a "coalescence step") of heating and thereby coalescing the aggregate particles, wherein the resin particle liquid dispersion is the resin particle liquid dispersion of the present invention.

In the production process of an electrostatic image developing toner of the present invention, if desired, a colorant particle-containing particle (in the case where a colorant is previously added to the resin at the polycondensation step or the like, the resin itself is a colored particle), a releasing agent particle, another resin particle, a liquid dispersion thereof or the like may be added to the liquid dispersion containing at least the resin particle liquid dispersion of the present invention. In the production process of an electrostatic image developing toner of the present invention, the particle diameter and particle diameter dispersion of the toner can be adjusted by aggregating (associating) the resin particles and other added particles in the liquid dispersion according to a known aggregation method of aggregating (associating) these particles. Regulation of toner particles by an emulsion polymerization-aggregation method is suitably used. More specifically, the resin particle liquid dispersion of the present invention is mixed with a colorant particle liquid dispersion, a releasing agent particle liquid dispersion and the like, a coagulant is added to generate hetero-aggregation and thereby form an aggregate particle having a toner size, and the aggregate particles are fused and coalesced under heating to a temperature higher than the glass transition point or melting point of the resin particle, then washed and dried. In this production process, the toner shape from amorphous to spherical can be controlled by selecting the heating temperature condition.

In the aggregation step of the present invention, aggregation and subsequent procedure may also be performed after a resin particle liquid dispersion other than the resin particle liquid dispersion of the present invention is mixed with the resin particle liquid dispersion of the present invention. At this time, a particle having a multilayer structure may be produced, for example, by previously aggregating the resin particle liquid dispersion of the present invention to form a first aggregate particle, and then further adding the resin particle liquid dispersion of the present invention or another resin particle liquid dispersion to form a second shell layer on the first particle surface. Needless to say, a multilayer particle may also be produced by the additions in the reverse order from the above-described example.

As for the coagulant, a surfactant, an inorganic salt or a divalent or higher polyvalent metal salt may be suitably used. In particular, a metal salt is preferred in view of aggregation control and properties such as toner chargeability. The metal salt compound used for the aggregation is obtained by dissolving a general inorganic metal compound or a polymer thereof in the resin particle liquid dispersion, and the metal element constituting the inorganic metal salt may be sufficient if it is a metal element having a divalent or higher electric charge, which belongs to Groups 2A, 3A, 4A, 5A, 6A, 7A, 8, 1B, 2B and 3B of the Periodic Table (long Periodic Table) and which dissolves in the form of ion in an aggregation system of resin particles. Specific preferred examples of the inorganic metal salt include a metal salt such as calcium chloride, calcium nitrate, barium chloride, magnesium chloride, zinc chloride, aluminum chloride and aluminum sulfate, and an inorganic metal salt polymer such as polyaluminum chloride, polyaluminum hydroxide and polycalcium sulfide. Among these, an aluminum salt and a polymer thereof are preferred. Generally, in order to obtain a sharper particle size distribution, the valence number of the inorganic metal salt is preferably divalence rather than monovalence and preferably trivalence or higher valence rather than divalence. When the valence is the same, a polymerization-type inorganic metal salt polymer is more preferred.

In the present invention, if desired, one or a plurality in combination of known additives may be blended within the range of not affecting the effects of the present invention. Examples of the additive include a flame retardant, a flame retardant aid, a brightener, a waterproof agent, a water repellent, an inorganic filler (surface modifier), a releasing agent, an antioxidant, a plasticizer, a surfactant, a dispersant, a lubricant, a filler, an extender pigment, a binder and a charge-control agent. These additives may be blended at any stage in the production of a coating agent.

Out of the internal additives, as for the charge control agent, various charge control agents commonly used, such as quaternary ammonium salt compound and nigrosine-based compound, may be used but in view of stability at the production and less contamination by waste water, a material hardly soluble in water is preferred.

Examples of the releasing agent which can be used include low molecular weight polyolefins such as polyethylene, polypropylene and polybutene; silicones showing a softening point softening under heat; fatty acid amides such as oleic acid amide, erucic acid amide, ricinoleic acid amide and stearic acid amide; an ester wax; a vegetable wax such as carnauba wax, rice wax, candelilla wax, Japan wax and jojoba oil; an animal wax such as bees wax; a mineral or petroleum wax such as montan wax, ozokerite, ceresin, paraffin wax, microcrystalline wax, microcrystalline wax and Fischer-Tropsch wax; and a modified product thereof.

Such a wax is dispersed in an aqueous medium together with an ionic surfactant and a polymer electrolyte such as polymer acid or polymer base, and pulverized under heating to a temperature higher than the melting point in a homogenizer or pressure jet-type disperser capable of applying strong shear, whereby a liquid dispersion of particles of 1 µm or less can be produced.

Examples of the flame retardant and flame retardant aid include, but are not limited to, a bromine-based flame retardant already used in general, antimony trioxide, magnesium hydroxide, aluminum hydroxide and ammonium polyphosphate.

Examples of the coloring component include a carbon black such as furnace black, channel black, acetylene black and thermal black; an inorganic pigment such as red iron oxide, iron blue and titanium oxide; an azo pigment such as Fast Yellow, Disazo Yellow, pyrazolone red, chelate red, Brilliant Carmine and Para Brown; a phthalocyanine pigment such as copper phthalocyanine and nonmetal phthalocyanine; a condensation polycyclic pigment such as flavanthrone yellow, dibromoanthrone orange, perylene red, Quinacridone Red and Dioxazine Violet; and various pigments such as chrome yellow, Hansa Yellow, Benzidine Yellow, Indanthrene Yellow, Quinoline Yellow, Permanent orange GTR, Pyrazolone Orange, Vulcan Orange, Watchung Red, Permanent Red, DuPont Oil Red, Lithol Red, Rhodamine B Lake, Lake Red C, Rose Bengal, Aniline Blue, Ultramarine Blue, Carco Oil Blue, Methylene Blue Chloride, Phthalocyanine Blue, Phthalocyanine Green, Malachite Green Oxalate, C.I. Pigment-Red 48:1, C.I. Pigment-Red 122, C.I. Pigment-Red 57:1, C.I. Pigment-Yellow 12, C.I. Pigment-Yellow 97, C.I. Pigment-Yellow 17, C.I. Pigment-Blue 15:1 and C.I. Pigment-Blue 15:3. One of these pigments may be used or two or more thereof may be used in combination.

Similarly to the normal toner, an inorganic particle such as silica, alumina, titania and calcium carbonate, or a resin particle such as polyester and silicone, may be added in the dry state under shearing to the surface of the toner after drying and used as a flowability aid or a cleaning aid.

Examples of the surfactant which can be used in the present invention include an anionic surfactant such as sulfuric ester salt type, sulfonate type, phosphoric ester type and soap type; and a cationic surfactant such as amine salt type and quaternary ammonium salt type. It is also effective to use a nonionic surfactant in combination, such as polyethylene glycol type, alkylphenol ethylene oxide adduct type and polyhydric alcohol type. As for the dispersing means, a generally employed device such as rotation shearing homogenizer and media-containing ball mill, sand mill or dynomill, may be used.

The toner of the present invention preferably has an accumulated volume average particle diameter $D_{50}$ of 3.0 to 20.0 µm and a volume average particle size distribution index GSDv of 1.4 or less, more preferably $D_{50}$ of 3.0 to 9.0 µm and GSDv of 1.3 or less. When a cumulative distribution of each volume is drawn from the small diameter side with respect to the particle size range (channel) divided on the basis of particle size distribution, the particle diameter at 16% accumulation is defined as $D_{16V}$ and the particle diameter at 84% accumulation is defined as $D_{84V}$. Using these, the volume average particle size distribution index (GSDv) is calculated according to the following formula:

$$GSDv = (D_{84V}/D_{16V})^{1/2}$$

When the GSDv is 1.4 or less, uniform particle diameter and good fixing property are attained and the apparatus is advantageously free from a trouble ascribable to fixing failure. Also, scattering of the toner causing contamination in the apparatus or deterioration of the developer less occurs and this is preferred. $D_{50}$ in the above-described range is preferred because appropriate adhesive force, good developability and excellent image resolution are obtained.

The accumulated volume average particle diameter ($D_{50}$) and the volume average particle size distribution index GSDv can be measured, for example, by a laser diffraction-type particle size distribution measuring device.

In view of image forming property, the shape factor SF1 of the toner of the present invention is preferably from 100 to 140, more preferably from 110 to 135. The SF1 is calculated as follows.

$$SF1 = \frac{(ML)^2}{A} \times \frac{\pi}{4} \times 100$$

wherein ML represents an absolute maximum length of the particle and A represents a projected area of the particle.

These are quantified mainly by inputting a microscopic image or a scanning electron microscopic image into a Luzex image analyzer, and analyzing the image.

After drying the obtained toner, similarly to the normal toner, for the purpose of imparting flowability or enhancing the cleaning property, an inorganic particle such as silica, alumina, titania, metatitanic acid compound and calcium carbonate, or a resin particle such as vinyl-based resin, polyester and silicone, may be used as an external additive and added to the toner particle surface while applying shear in a dry state.

In the case of attaching such a particle to the toner surface in an aqueous medium, as for the inorganic particle, those usually used as an external additive to the toner surface, such as silica, alumina, titania, calcium carbonate, magnesium carbonate and tricalcium phosphate, all may be used by dispersing the additive with an ionic surfactant, a polymer acid or a polymer base.

(Electrostatic Image Developer)

The electrostatic image developing toner of the present invention may be used as an electrostatic image developer. This developer is not particularly limited as long as it contains the electrostatic image developing toner, and may take an appropriate component composition according to the purpose. When the electrostatic image developing toner is used alone, the developer is prepared as a one-component system electrostatic image developer, whereas when the toner is used in combination with a carrier, the developer is prepared as a two-component system electrostatic image developer.

In the case of a one-component system developer, a method of causing frictional electrification with a developing sleeve or an electrifying member to form an electrified toner, and performing development according to the electrostatic latent image may also be applied.

The carrier is not particularly limited, but examples of the carrier usually employed include a magnetic particle such as iron powder, ferrite, iron oxide powder and nickel; a resin-coated carrier obtained by coating the surface of a magnetic particle as a core material with a resin such as styrene-based resin, vinyl-based resin, ethyl-based resin, rosin-based resin, polyester-based resin and methyl-based resin or with a wax such as stearic acid to form a resin coat layer; and a magnetic material dispersion-type carrier obtained by dispersing magnetic particles in a binder resin. Among these, a resin-coated carrier is preferred because the toner chargeability or the resistance of the entire carrier can be controlled by the constitution of the resin coat layer.

The mixing ratio between the toner of the present invention and the carrier in the two-component system electrostatic image developer is usually from 2 to 10 parts by weight of toner per 100 parts by weight of carrier. The preparation method of the developer is not particularly limited, but examples thereof include a method of mixing the toner and the carrier by a V blender or the like.

(Image Forming Method)

The electrostatic image developing toner and electrostatic image developer of the present invention may be used for an image forming method in a normal electrostatic image developing system (electrophotographic system).

The image forming method of the present invention is an image forming method comprising a latent image-forming step of forming an electrostatic latent image on the surface of a latent image-holding member, a development step of developing the electrostatic latent image formed on the surface of the latent image-holding member with a developer containing a toner to form a toner image, a transfer step of transferring the toner image formed on the surface of the latent image-holding member to the surface of a transferee member, and a fixing step of heat-fixing the toner image transferred to the surface of the transferee member, wherein the toner is the electrostatic image developing toner of the present invention, or the developer is the electrostatic image developer of the present invention.

The above-described steps all may utilize the steps known in the image forming method, for example, the steps described in JP-A-56-40868 and JP-A-49-91231. Also, the image forming method of the present invention may comprise a step other than those steps, and preferred examples of such a step include a cleaning step of removing the electrostatic image developer remaining on the electrostatic latent image-supporting member. In a preferred embodiment, the image forming method of the present invention further comprises a recycling step. This recycling step is a step of transferring the electrostatic image developing toner recovered in the cleaning step to the developer layer. The image forming method in this embodiment comprising a recycling step can be performed by using an image forming apparatus such as toner recycling system-type copying machine or facsimile machine. The image forming method of the present invention may also be applied to a recycling system in which the cleaning step is omitted and the toner is recovered simultaneously with the development.

As for the latent image-holding member, for example, an electrophotographic photoreceptor or a dielectric recording material may be used.

In the case of an electrophotographic photoreceptor, the surface of the electrophotographic photoreceptor is uniformly charged by a corotron charging device or a contact charging device and then exposed to form an electrostatic latent image (latent image-forming step). Thereafter, the photoreceptor is caused to come in contact with or close to a developing roller having formed on the surface thereof a developer layer to allow for attachment of toner particles to the electrostatic latent image, thereby forming a toner image on the electrophotographic photoreceptor (development step). The toner image formed is transferred to the surface of a transferee member such as paper by using a corotron charging device (transfer step). Furthermore, the toner image transferred to the surface of the transferee member is heat-fixed by a fixing machine to form a final toner image (fixing step).

At the heat-fixing by a fixing machine, a releasing agent is generally supplied to the fixing member of the fixing machine so as to prevent offset or the like.

EXAMPLES

The present invention is described in greater detail below by referring to Examples, but the present invention is not limited thereto.

Example 1

<Preparation of Oil Phase 1>

| | |
|---|---|
| 1,9-Nonanediol | 11.3 parts by weight |

<Preparation of Oil Phase 1>

| | |
|---|---|
| (monomer melting point: 47° C.) | |
| 1,10-Decanedicarboxylic acid (dodecane diacid, monomer melting point: 130° C.) | 3.4 parts by weight |
| Diethyl fumarate | 12.0 parts by weight |
| (monomer melting point: 2° C.) | (25 wt % of the total) |
| Styrene | 21.0 parts by weight |
| Stearyl methacrylate | 1.66 parts by weight |
| Dodecanethiol | 1.0 part by weight |

These components are dissolved under heat at 130° C. to prepare a uniform oil phase.

<Preparation of Aqueous Phase 1>

| | |
|---|---|
| Dodecylbenzenesulfonic acid | 1.66 parts by weight |
| Water | 200 parts by weight |

<Production of Resin Particle Liquid Dispersion 1>

The aqueous solution above is prepared and stirred in a constant-temperature bath at 70° C. for 1 hour. The aqueous phase is charged into a 1 liter-volume vessel and mixed with the oil phase and after stirring in Ultra-Turrax (manufactured by IKA Works, Inc.) at 8,000 rpm for 3 minutes, the resulting emulsified product is charged into a 500 ml-volume reactor equipped with a stirrer and subjected to polycondensation at 70° C. for 24 hours in a nitrogen atmosphere.

Thereafter, a material obtained by dissolving 1.1 parts by weight of ammonium persulfate in 10 parts by weight of ion exchanged water is added to the resin particle liquid dispersion prepared above, and polymerization is further performed for 6 hours in a nitrogen atmosphere. The obtained liquid dispersion is rapidly cooled with ice water, as a result, the liquid dispersion temperature became 2.5° C. This liquid dispersion is sampled in a small amount and the physical properties of the polyester/polystyrene composite polymer are measured.

Weight average molecular weight of polystyrene by GPC: 48,200

Number average molecular weight of polyester by GPC: 2,250

Melting point of polyester: 59° C.

Median diameter: 0.4 μm

The polymerization product obtained as above is confirmed to be a composite particle of polystyrene and polyester.

In the measurement of the molecular weight, the weight average molecular weight Mw and the number average molecular weight Mn are measured under the conditions described below by gel permeation chromatography (GPC). The measurement is performed at a temperature of 40° C. by passing a solvent (tetrahydrofuran) at a flow velocity of 1.2 ml/min, and injecting 3 mg as the sample weight of a tetrahydrofuran sample solution having a concentration of 0.2 g/20 ml. At the measurement of the molecular weight of a sample, the measurement conditions are selected such that the molecular weight of the sample is included in the range where a logarithm and a count number of a molecular weight in a calibration curve produced from several kinds of monodisperse polystyrene standard samples form a straight line.

In this connection, the reliability of the measurement results can be confirmed by the finding that an NBS706 polystyrene standard sample measured under the above-described conditions has:

weight average molecular weight Mw=28.8×10$^4$ number average molecular weight Mn=13.7×10$^4$ As for the column of GPC, a column satisfying the conditions above, such as TSK-GEL and GMH (produced by Tosoh Corp.), is used.

The melting point of the polyester is measured by using a differential scanning calorimeter (DSC50, manufactured by Shimadzu Corp.).

The viscoelasticity of the resin particle is measured by using a rotary plate-type rheometer (RDA, 2RHIOS SYSTEM ver. 4.3.2, manufactured by Rheometric Scientific F.E. Ltd.). After setting each resin particle as a measuring object in a sample holder, the measurement is performed at a temperature rising rate of 1° C./min, a frequency of 1 rad/sec, a distortion of 20% or less and a detection torque within the range of the measurement compensation value. An 8-mm sample holder or a 20-mm sample holder is used as needed.

Example 2

<Preparation of Oil Phase 2>

| | |
|---|---|
| 1,9-Nonanediol | 6.0 parts by weight |
| (monomer melting point: 47° C.) | |
| 1,10-Decanedicarboxylic acid | 6.0 parts by weight |
| (monomer melting point: 130° C.) | |
| Diethyl fumarate | 2.1 parts by weight |
| (monomer melting point: 2° C.) | (4 wt % of the total) |
| Styrene | 35.0 parts by weight |
| Stearyl methacrylate | 1.66 parts by weight |
| Dodecanethiol | 1.0 part by weight |

These components are dissolved under heat at 130° C. to prepare a uniform oil phase.

<Preparation of Aqueous Phase 2>

| | |
|---|---|
| Dodecylbenzenesulfonic acid | 1.66 parts by weight |
| Water | 200 parts by weight |

<Production of Resin Particle Liquid Dispersion 2>

The aqueous solution above is prepared and stirred in a constant-temperature bath at 70° C. for 1 hour. The aqueous phase is charged into a 1 liter-volume vessel and mixed with the oil phase and after stirring in Ultra-Turrax (manufactured by IKA Works, Inc.) at 8,000 rpm for 3 minutes, the resulting emulsified product is charged into a 500 ml-volume reactor equipped with a stirrer and subjected to polycondensation at 70° C. for 24 hours in a nitrogen atmosphere.

Thereafter, a material obtained by dissolving 1.1 parts by weight of ammonium persulfate in 10 parts by weight of ion exchanged water is added to the resin particle liquid dispersion prepared above, and polymerization is further performed for 6 hours in a nitrogen atmosphere. The obtained liquid dispersion is rapidly cooled with ice water, as a result, the liquid dispersion temperature became 2.5° C. This liquid dispersion is sampled in a small amount and the physical properties of the polyester/polystyrene composite polymer are measured.

Weight average molecular weight of polystyrene by GPC: 48,200

Number average molecular weight of polyester by GPC: 2,100

Melting point of polyester: 61° C.

Median diameter: 0.3 μm

The viscoelasticity is measured in the same manner as Resin Particle Liquid Dispersion 1.

The polymerization product obtained as above is confirmed to be a composite particle of polystyrene and polyester.

Example 3

| <Preparation of Oil Phase 3-1> | |
| --- | --- |
| 1,9-Nonanediol (monomer melting point: 47° C.) | 12.0 parts by weight |
| Sebacic acid (monomer melting point: 134° C.) | 16.0 parts by weight |
| Styrene | 25.0 parts by weight |
| Dodecanethiol | 1.35 parts by weight |
| Stearyl methacrylate | 2.5 parts by weight |

These components are dissolved under heat at 130° C. to prepare a uniform oil phase.

| <Preparation of Oil Phase 3-2> | |
| --- | --- |
| Hexamethylene diisocyanate | 30.0 parts by weight (30% of the total) |
| Styrene | 5.0 parts by weight |
| <Preparation of Aqueous Phase 3> | |
| Dodecylbenzenesulfonic acid | 2.50 parts by weight |
| Water | 100 parts by weight |

<Production of Resin Particle Liquid Dispersion 3>

The aqueous solution above is prepared and stirred in a constant-temperature bath at 85° C. for 1 hour. The aqueous phase is charged into a 1 liter-volume vessel and mixed with Oil Phase 3-1 and after stirring in Ultra-Turrax (manufactured by IKA Works, Inc.) at 8,000 rpm for 3 minutes, the resulting emulsified product is charged into a 500 ml-volume reactor equipped with a stirrer and subjected to polycondensation at 70° C. for 24 hours in a nitrogen atmosphere.

After stirring Oil Phase 3-2 at room temperature for 30 minutes, Oil Phase 3-2 is added dropwise to the resin particle liquid dispersion obtained above. Furthermore, 30 minutes after that, a material obtained by dissolving 0.8 parts by weight of ammonium persulfate in 10.0 parts by weight of ion exchanged water is added, and polymerization is further performed for 6 hours in a nitrogen atmosphere. The obtained resin particle liquid dispersion is rapidly cooled with ice water, as a result, the liquid dispersion temperature became 2.5° C. This liquid dispersion is sampled in a small amount and the physical properties of the polyester/polystyrene composite polymer are measured.

Weight average molecular weight of polystyrene by GPC: 38,600

Number average molecular weight of polyester by GPC: 4,550

Melting point of polyester: 58° C.

Median diameter: 0.36 μm

The polymerization product obtained as above is confirmed to be a composite particle of polystyrene and urethane-modified polyester.

Example 4

| <Preparation of Oil Phase 4-1> | |
| --- | --- |
| 1,12-Dodecanediol (monomer melting point: 84° C.) | 6.8 parts by weight |
| 1,11-Undecanedicarboxylic acid (tridecane diacid, monomer melting point: 112° C.) | 8.2 parts by weight |
| Styrene | 35.0 parts by weight |
| Dodecanethiol | 1.0 part by weight |
| Hexadecane | 1.5 parts by weight |

These components are dissolved under heat at 130° C. to prepare a uniform oil phase.

| <Preparation of Oil Phase 4-2> | |
| --- | --- |
| Carbodilite V02L2 (produced by Nisshinbo Industries, Inc.) | 10.0 parts by weight |
| Styrene | 5.0 parts by weight |
| <Preparation of Aqueous Phase 4> | |
| Scandium dodecylsulfate | 7.2 parts by weight |
| Water | 150 parts by weight |

<Production of Resin Particle Liquid Dispersion 4>

The aqueous solution above is prepared and stirred in a constant-temperature bath at 75° C. for 1 hour. The aqueous phase is charged into a 1 liter-volume vessel and mixed with the oil phase and after stirring in Ultra-Turrax (manufactured by IKA Works, Inc.) at 8,000 rpm for 3 minutes, the resulting emulsified product is charged into a 500 ml-volume reactor equipped with a stirrer and subjected to polycondensation at 70° C. for 24 hours in a nitrogen atmosphere. Subsequently, Oil Phase 4-2 is added dropwise, and polycondensation is further performed at 70° C. for 6 hours.

Thereafter, a material obtained by dissolving 1.1 parts by weight of ammonium persulfate in 10 parts by weight of ion exchanged water is added to the resin particle liquid dispersion prepared above, and polymerization is further performed for 6 hours in a nitrogen atmosphere. The obtained liquid dispersion is rapidly cooled with ice water, as a result, the liquid dispersion temperature became 2.5° C. This liquid dispersion is sampled in a small amount and the physical properties of the polyester/polystyrene composite polymer are measured.

Weight average molecular weight of polystyrene by GPC: 53,300

Number average molecular weight of polyester by GPC: 3,050

Melting point of polyester: 71° C.

Median diameter: 0.4 μm

The viscoelasticity is measured in the same manner as Resin Particle Liquid Dispersion 1.

The polymerization product obtained as above is confirmed to be a composite particle of polystyrene and polyester.

Example 5

<Preparation of Oil Phase 5-1>

| | |
|---|---|
| 1,9-Nonanediol (monomer melting point: 47° C.) | 10.0 parts by weight |
| 1,10-Decanedicarboxylic acid | 10.0 parts by weight |
| (monomer melting point: 130° C.) | |
| Pyromellitic acid | 5 parts by weight |
| (monomer melting point: 284° C.) | (9 wt % of the total) |
| Styrene | 20.0 parts by weight |
| Stearyl methacrylate | 1.66 parts by weight |
| Dodecanethiol | 1.0 part by weight |

These components are dissolved under heat at 130° C. to prepare a uniform oil phase.

<Preparation of Oil Phase 5-2>

| | |
|---|---|
| Hexamethylene diisocyanate | 5.0 parts by weight |
| | (9 wt % of all monomers) |
| Styrene | 5.0 parts by weight |

<Preparation of Aqueous Phase 5>

| | |
|---|---|
| Dodecylbenzenesulfonic acid | 1.66 parts by weight |
| Water | 175 parts by weight |

<Production of Resin Particle Liquid Dispersion 5>

The aqueous solution above is prepared and stirred in a constant-temperature bath at 75° C. for 1 hour. The aqueous phase is charged into a 1 liter-volume vessel and mixed with the oil phase and after stirring in Ultra-Turrax (manufactured by IKA Works, Inc.) at 8,000 rpm for 3 minutes, the resulting emulsified product is charged into a 500 ml-volume reactor equipped with a stirrer and subjected to polycondensation at 70° C. for 24 hours in a nitrogen atmosphere. Subsequently, Oil Phase 5-2 is added dropwise, and polycondensation is further performed at 70° C. for 6 hours.

Thereafter, a material obtained by dissolving 0.8 parts by weight of ammonium persulfate in 10.0 parts by weight of ion exchanged water is added to the resin particle liquid dispersion prepared above, and polymerization is further performed for 6 hours in a nitrogen atmosphere, as a result, a stable resin particle liquid dispersion is obtained. This liquid dispersion is sampled in a small amount and the physical properties of the polyester/polystyrene composite polymer are measured.

Weight average molecular weight of polystyrene by GPC: 86,100

Number average molecular weight of polyester by GPC: 1,950

Melting point of polyester: 59° C.

Median diameter: 0.42 μm

The polymerization product obtained as above is confirmed to be a composite particle of polystyrene and polyester.

Comparative Example 1

<Preparation of Oil Phase 6>

| | |
|---|---|
| 1,9-Nonanediol | 10.0 parts by weight |
| (monomer melting point: 47° C.) | |
| 1,10-Decanedicarboxylic acid | 14.4 parts by weight |
| (monomer melting point: 130° C.); | |
| Styrene | 25.0 parts by weight |
| Stearyl methacrylate | 1.66 parts by weight |
| Dodecanethiol | 1.0 part by weight |

These components are dissolved under heat at 130° C. to prepare a uniform oil phase.

<Preparation of Aqueous Phase 6>

| | |
|---|---|
| Dodecylbenzenesulfonic acid | 1.66 parts by weight |
| Water | 200 parts by weight |

<Production of Resin Particle Liquid Dispersion 6>

The aqueous solution above is prepared and stirred in a constant-temperature bath at 75° C. for 1 hour. The aqueous phase is charged into a 1 liter-volume vessel and mixed with the oil phase and after stirring in Ultra-Turrax (manufactured by IKA Works, Inc.) at 8,000 rpm for 3 minutes, the resulting emulsified product is charged into a 500 ml-volume reactor equipped with a stirrer and subjected to polycondensation at 70° C. for 24 hours in a nitrogen atmosphere.

Thereafter, a material obtained by dissolving 0.8 parts by weight of ammonium persulfate in 10.0 parts by weight of ion exchanged water is added to the resin particle liquid dispersion prepared above, and polymerization is further performed for 6 hours in a nitrogen atmosphere. The obtained resin particle liquid dispersion is rapidly cooled with ice water, as a result, the liquid dispersion temperature became 2.5° C. In this way, a stable resin particle liquid dispersion is obtained. This liquid dispersion is sampled in a small amount and the physical properties of the polyester/polystyrene composite polymer are measured.

Weight average molecular weight of polystyrene by GPC: 44,400

Number average molecular weight of polyester by GPC: 1,750

Melting point of polyester: 60° C.

Median diameter: 0.36 μm

The polymerization product obtained as above is confirmed to be a composite particle of polystyrene and polyester.

Comparative Example 2

<Preparation of Oil Phase 7-1>

| | |
|---|---|
| 1,9-Nonanediol | 12.0 parts by weight |
| (monomer melting point: 47° C.) | |
| Sebacic acid | 16.0 parts by weight |

| <Preparation of Oil Phase 7-1> | |
|---|---|
| (monomer melting point: 134° C.) | |
| Styrene | 25.0 parts by weight |
| Dodecanethiol | 0.755 parts by weight |
| Stearyl methacrylate | 1.66 parts by weight |

These components are dissolved under heat at 130° C. to prepare a uniform oil phase.

| <Preparation of Oil Phase 7-2> | |
|---|---|
| Hexamethylene diisocyanate | 3.0 parts by weight |
| | (5% of all monomers) |
| Styrene | 5.0 parts by weight |
| <Preparation of Aqueous Phase 7> | |
| Dodecylbenzenesulfonic acid | 1.66 parts by weight |
| Water | 100 parts by weight |

<Production of Resin Particle Liquid Dispersion 7>

The aqueous solution above is prepared and stirred in a constant-temperature bath at 85° C. for 1 hour. The aqueous phase is charged into a 1 liter-volume vessel and mixed with Oil Phase 7-1 and after stirring in Ultra-Turrax (manufactured by IKA Works, Inc.) at 8,000 rpm for 3 minutes, the resulting emulsified product is charged into a 500 ml-volume reactor equipped with a stirrer and subjected to polycondensation at 85° C. for 24 hours in a nitrogen atmosphere.

After stirring Oil Phase 7-2 at room temperature for 30 minutes, Oil Phase 7-2 is added dropwise to the resin particle liquid dispersion obtained above. Furthermore, 30 minutes after that, a material obtained by dissolving 0.8 parts by weight of ammonium persulfate in 10.0 parts by weight of ion exchanged water is added, and polymerization is further performed for 6 hours in a nitrogen atmosphere. The obtained resin particle liquid dispersion is sampled in a small amount and the physical properties of the urethane-modified polyester/polystyrene composite polymer are measured.

Weight average molecular weight of polystyrene by GPC: 55,500

Number average molecular weight of polyester by GPC: 1,950

Melting point of polyester: 59° C.

Median diameter: 0.51 μm

The polymerization product obtained as above is confirmed to be a composite particle of polystyrene and urethane-modified polyester.

Comparative Example 3

| <Preparation of Oil Phase 8> | |
|---|---|
| 1,9-Nonanediol | 10.0 parts by weight |
| (monomer melting point: 47° C.) | |
| 1,10-Decanedicarboxylic acid | 10.0 parts by weight |
| (monomer melting point: 130° C.) | |
| Styrene | 25.0 parts by weight |
| Diethyl fumarate | 2.1 parts by weight |
| (monomer melting point: 2° C.) | (4 wt % of the total) |
| Dodecanethiol | 0.75 parts by weight |

These components are dissolved under heat at 130° C. to prepare a uniform oil phase.

| <Preparation of Aqueous Phase 8> | |
|---|---|
| Para-toluenesulfonic acid | 2.50 parts by weight |
| Cetyl alcohol | 1.45 parts by weight |
| Water | 100 parts by weight |

<Production of Resin Particle Liquid Dispersion 8>

The aqueous solution above is prepared and stirred in a constant-temperature bath at 85° C. for 1 hour. The aqueous phase is charged into a 1 liter-volume vessel and mixed with the oil phase and after stirring in Ultra-Turrax (manufactured by IKA Works, Inc.) at 8,000 rpm for 3 minutes, the resulting emulsified product is charged into a 500 ml-volume reactor equipped with a stirrer and subjected to polycondensation at 85° C. for 24 hours in a nitrogen atmosphere. Thereafter, a material obtained by dissolving 0.8 parts by weight of ammonium persulfate in 10.0 parts by weight of ion exchanged water is added, and polymerization is further performed for 6 hours in a nitrogen atmosphere. The obtained liquid dispersion is rapidly cooled with ice water, as a result, the liquid dispersion temperature became 2.5° C. This liquid dispersion is sampled in a small amount and the physical properties of the polyester/polystyrene composite polymer are measured.

Weight average molecular weight of polystyrene by GPC: 147,100

Number average molecular weight of polyester by GPC: 2,500

Melting point of polyester: 62° C.

Median diameter: 0.51 μm

The polymerization product obtained as above is confirmed to be a composite particle of polystyrene and urethane-modified polyester.

Comparative Example 4

| <Preparation of Oil Phase 9> | |
|---|---|
| 1,9-Nonanediol | 6.0 parts by weight |
| (monomer melting point: 47° C.) | |
| 1,10-Decanedicarboxylic acid | 6.0 parts by weight |
| (monomer melting point: 130° C.) | |
| Diethyl fumarate | 2.1 parts by weight |
| (monomer melting point: 2° C.) | (20 wt % of the total) |
| Styrene | 35.0 parts by weight |
| Stearyl methacrylate | 1.66 parts by weight |
| Dodecanethiol | 1.0 part by weight |

These components are dissolved under heat at 130° C. to prepare a uniform oil phase.

| <Preparation of Aqueous Phase 9> | |
|---|---|
| Dodecylbenzenesulfonic acid | 1.66 parts by weight |
| Water | 200 parts by weight |

<Production of Resin Particle Liquid Dispersion 9>

The aqueous solution above is prepared and stirred in a constant-temperature bath at 70° C. for 1 hour. The aqueous phase is charged into a 1 liter-volume vessel and mixed with the oil phase and after stirring in Ultra-Turrax (manufactured by IKA Works, Inc.) at 8,000 rpm for 3 minutes, the resulting emulsified product is charged into a 500 ml-volume reactor equipped with a stirrer and subjected to polycondensation at 40° C. for 24 hours in a nitrogen atmosphere.

Thereafter, a material obtained by dissolving 1.1 parts by weight of ammonium persulfate in 10 parts by weight of ion exchanged water is added to the resin particle liquid dispersion prepared above, and polymerization is further performed for 6 hours in a nitrogen atmosphere. The obtained liquid dispersion is rapidly cooled with ice water, as a result, the liquid dispersion temperature became 2.5° C. This liquid dispersion is sampled in a small amount and the physical properties of the polyester/polystyrene composite polymer are measured.

Weight average molecular weight of polystyrene by GPC: 152,200

Number average molecular weight of polyester by GPC: 1,500

Melting point of polyester: 51° C.

Median diameter: 3.2 μm

The viscoelasticity is measured in the same manner as Resin Particle Liquid Dispersion 1.

The polymerization product obtained as above is confirmed to be a composite particle of polystyrene and polyester.

Comparative Example 5

| <Preparation of Oil Phase 10> | |
|---|---|
| 1,9-Nonanediol (monomer melting point: 47° C.) | 6.0 parts by weight |
| Adipic acid (monomer melting point: 152° C.) | 4.0 parts by weight |
| Diethyl fumarate (monomer melting point: 2° C.) | 2.1 parts by weight (20 wt % of the total) |
| Styrene | 35.0 parts by weight |
| Stearyl methacrylate | 1.66 parts by weight |
| Dodecanethiol | 1.0 part by weight |

These components are dissolved under heat at 130° C. to prepare a uniform oil phase.

<Production of Resin Particle Liquid Dispersion 10>

The aqueous solution above is prepared and stirred in a constant-temperature bath at 100° C. for 1 hour. The aqueous phase is charged into a 1 liter-volume vessel and mixed with the oil phase and after stirring in Ultra-Turrax (manufactured by IKA Works, Inc.) at 8,000 rpm for 3 minutes, the resulting emulsified product is charged into a 500 ml-volume reactor equipped with a stirrer and subjected to polycondensation at 40° C. for 24 hours in a nitrogen atmosphere.

Thereafter, a material obtained by dissolving 1.1 parts by weight of ammonium persulfate in 10 parts by weight of ion exchanged water is added to the resin particle liquid dispersion prepared above, and polymerization is further performed for 6 hours in a nitrogen atmosphere. The obtained liquid dispersion is rapidly cooled with ice water, as a result, the liquid dispersion temperature became 2.5° C. This liquid dispersion is sampled in a small amount and the physical properties of the polyester/polystyrene composite polymer are measured.

Weight average molecular weight of polystyrene by GPC: 109,200

Number average molecular weight of polyester by GPC: 1,250

Melting point of polyester: 49° C.

Median diameter: 1.2 μm

The viscoelasticity is measured in the same manner as Resin Particle Liquid Dispersion 1.

The polymerization product obtained as above is confirmed to be a composite particle of polystyrene and polyester.

TABLE 1

| | Example | | | | | Comparative Example | | | | |
|---|---|---|---|---|---|---|---|---|---|---|
| | 1 | 2 | 3 | 4 | 5 | 1 | 2 | 3 | 4 | 5 |
| Median diameter (μm) | 0.4 | 0.3 | 0.36 | 0.4 | 0.42 | 0.36 | 0.51 | 0.51 | 3.2 | 1.2 |
| Tm (° C.) | 59 | 61 | 58 | 71 | 59 | 60 | 59 | 62 | 51 | 49 |
| Tc (° C.) | 70 | 70 | 70 | 70 | 70 | 70 | 85 | 85 | 40 | 100 |
| Th (° C.) | 130 | 130 | 134 | 112 | 284 | 130 | 134 | 130 | 130 | 152 |
| Number average molecular weight Mn (polyester) | 2250 | 2100 | 4550 | 3050 | 1950 | 1750 | 1950 | 2500 | 1500 | 1250 |
| GL (30) (Pa) | $4.1 \times 10^8$ | $1.2 \times 10^8$ | $3.3 \times 10^8$ | $7.5 \times 10^7$ | $9.3 \times 10^7$ | $4.8 \times 10^6$ | $7.5 \times 10^6$ | $8.8 \times 10^6$ | $2.5 \times 10^5$ | $5.7 \times 10^6$ |
| $\Delta T$ ($1 \times 10^6 \rightarrow 1 \times 10^4$) (° C.) | 7.3 | 8.4 | 5.9 | 7.3 | 10.5 | 8.0 | 6.9 | 9.4 | immeasurable | 13.5 |
| $\Delta T$ ($1 \times 10^7 \rightarrow 1 \times 10^3$) (° C.) | 15.8 | 17.1 | 14.6 | 16.7 | 18.2 | immeasurable | immeasurable | immeasurable | immeasurable | immeasurable |
| $|\log G'(Tm + 20) - \log G'(Tm + 50)|$ | 0.68 | 1.02 | 0.71 | 0.89 | 1.11 | 2.30 | 1.80 | 1.25 | 1.75 | 2.0 |

| <Preparation of Aqueous Phase 10> | |
|---|---|
| Dodecylbenzenesulfonic acid | 1.66 parts by weight |
| Water | 200 parts by weight |

| (Preparation of Releasing agent Particle Liquid Dispersion (W1)) | |
|---|---|
| Polyethylene wax (Polywax 725, produced by Toyo-Petrolite K.K., melting point: 103° C.) | 30 parts by weight |
| Cationic surfactant (Sanizol B50, Kao Corp.) | 3 parts by weight |

(Preparation of Releasing agent Particle Liquid Dispersion (W1))

| | |
|---|---|
| Ion exchanged water | 67 parts by weight |

These components are thoroughly dispersed in a homogenizer (Ultra-Turrax T50, manufactured by IKA Works, Inc.) under heating at 95° C. and then dispersed in a pressure jet-type homogenizer (Gaulin homogenizer, manufactured by Gaulin) to prepare Releasing Agent Particle Liquid Dispersion (W1). The number average particle diameter $D_{50n}$ of the releasing agent particles in the obtained liquid dispersion is 310 nm. Thereafter, ion exchanged water is added to adjust the solid concentration of the liquid dispersion to 30%.

(Preparation of Magenta Pigment Liquid Dispersion (M1))

| | |
|---|---|
| Magenta pigment (PR122 (quinacridone), produced by Dainichiseika Color & Chemicals Mfg. Co., Ltd.) | 20 parts by weight |
| Anionic surfactant (Neogen R, produced by Daiichi Kogyo Seiyaku Co., Ltd.) | 2 parts by weight |
| Ion exchanged water | 78 parts by weight |

These components are dispersed in a homogenizer (Ultra-Turrax T50, manufactured by IKA Works, Inc.) at 3,000 rpm for 2 minutes, thereby causing the pigment to get affinity for water, and further dispersed at 5,000 rpm for 10 minutes. The resulting dispersion is stirred for one day and night by an ordinary stirrer to effect defoaming and then dispersed under a pressure of 240 MPa for about 1 hour by using a high pressure impact-type dispersing machine Altimizer (HJP30006, manufactured by Sugino Machine Ltd.) to obtain Magenta Pigment Liquid Dispersion (M1). The number average particle diameter $D_{50n}$ of the pigment in the liquid dispersion is 106 nm. Thereafter, ion exchanged water is added to adjust the solid concentration of the liquid dispersion to 15%.

(Preparation of Cyan Pigment Liquid Dispersion (C1))

| | |
|---|---|
| Cyan pigment (PB15:3, produced by Dainichiseika Color & Chemicals Mfg. Co., Ltd.) | 20 parts by weight |
| Anionic surfactant (Neogen R, produced by Daiichi Kogyo Seiyaku Co., Ltd.) | 2 parts by weight |
| Ion exchanged water | 78 parts by weight |

A cyan pigment liquid dispersion is prepared in the same manner as Magenta Pigment Liquid Dispersion (M1) except for using the above-described components. The number average particle diameter $D_{50n}$ of the pigment in the liquid dispersion is 121 nm. Thereafter, ion exchanged water is added to adjust the solid concentration of the liquid dispersion to 15%.

(Preparation of Yellow Pigment Liquid Dispersion (Y1))

| | |
|---|---|
| Yellow pigment (PY74, produced by Clariant Japan) | 20 parts by weight |
| Anionic surfactant (Neogen R, produced by Daiichi Kogyo Seiyaku Co., Ltd.) | 2 parts by weight |
| Ion exchanged water | 78 parts by weight |

A yellow pigment liquid dispersion is prepared in the same manner as Magenta Pigment Liquid Dispersion (M1) except for using the above-described components. The number average particle diameter $D_{50n}$ of the pigment in the liquid dispersion is 118 nm. Thereafter, ion exchanged water is added to adjust the solid concentration of the liquid dispersion to 15%.

(Preparation of Black Pigment Liquid Dispersion (K1))

| | |
|---|---|
| Carbon black (Regal 330, produced by Cabot Inc.) | 20 parts by weight |
| Anionic surfactant (Neogen R, produced by Daiichi Kogyo Seiyaku Co., Ltd.) | 2 parts by weight |
| Ion exchanged water | 78 parts by weight |

A black pigment liquid dispersion is prepared in the same manner as Magenta Pigment Liquid Dispersion (M1) except for using the above-described components. The number average particle diameter $D_{50n}$ of the pigment in the liquid dispersion is 120 nm. Thereafter, ion exchanged water is added to adjust the solid concentration of the liquid dispersion to 15%.

(Preparation of Resin Particle Liquid Dispersion A: non-crystalline vinyl-based resin latex)

| | |
|---|---|
| Styrene | 460 parts by weight |
| n-Butyl acrylate | 140 parts by weight |
| Acrylic acid | 12 parts by weight |
| Dodecanethiol | 9 parts by weight |

These components are mixed and dissolved to prepare a solution.

Separately, 12 parts by weight of an anionic surfactant (Dowfax, produced by Dow Chemical, Inc.) is dissolved in 250 parts by weight of ion exchanged water, and the solution prepared above is added thereto, followed by dispersion and emulsification in a flask (Monomer Emulsion A).

Furthermore, 1 part by weight of an anionic surfactant (Dowfax, produced by Dow Chemical, Inc.) is dissolved in 555 parts by weight of ion exchanged water, and the resulting solution is charged into a polymerization flask.

The polymerization flask is tightly plugged and after connecting a reflux tube thereto, the polymerization flask is heated to 75° C. on a water bath with slow stirring while injecting nitrogen, and this condition is maintained.

9 Parts by weight of ammonium persulfate is dissolved in 43 parts by weight of ion exchanged water, and the resulting solution is added dropwise to the polymerization flask through a metering pump over 20 minutes, and then Monomer Emulsion A is also added dropwise through a metering pump over 200 minutes.

Thereafter, the polymerization flask is maintained at 75° C. for 3 hours while continuing slowly stirring to complete the polymerization.

In this way, Anionic Resin Particle Liquid Dispersion A containing resin particles with a median diameter of 230 nm, a glass transition point of 53.5° C. and a weight average molecular weight of 36,000, and having a solid content of 42% is obtained.

Example 6

Production of Toner Using Resin Particle Liquid Dispersion 1

(Production of Black Toner (Toner K1))

| | |
|---|---|
| Resin Particle Liquid Dispersion 1 | 120 parts by weight |
| Resin Particle Liquid Dispersion A | 40 parts by weight |
| Releasing Agent Particle Liquid Dispersion (W1) | 33 parts by weight |
| Black Pigment Liquid Dispersion (K1) | 60 parts by weight |
| An aqueous 10 mass % polyaluminum chloride solution (PAC100W, produced by Asada Kagaku K.K.) | 15 parts by weight |
| An aqueous 1% nitric acid solution | 3 parts by weight |

These components are dispersed by using a homogenizer (Ultra-Turrax T50, manufactured by IKA Works, Inc.) at 5,000 rpm for 3 minutes in a round-shaped stainless steel-made flask, and then a lid equipped with a stirrer having magnetic seal, a thermometer and a pH meter is put on the flask. Thereafter, a mantle heater for heating is set, and the flask is heated to 57° C. at a rate of 1° C./min with stirring under appropriate control to a minimum rotation number necessary for stirring the entire liquid dispersion in the flask. The temperature is kept at 57° C. for 30 minutes, and the particle diameter of the aggregate particles is confirmed by a Coulter counter (TA II, manufactured by Beckman-Coulter Corp.). Immediately after stopping of the temperature elevation, 50 parts by weight of Resin Particle Liquid Dispersion 1 is added, and the mixture is kept for 30 minutes. Subsequently, an aqueous sodium hydroxide solution is added until the pH of the system became 6.5, and then the mixture is heated to 97° C. at 1° C./min. After the elevation of temperature, an aqueous nitric acid solution is added to adjust the pH of the system to 5.0, and the mixture is kept for 10 hours to coalesce aggregate particles under heat. Thereafter, the temperature of the system is lowered to 50° C., and an aqueous sodium hydroxide solution is added to adjust the pH to 12.0. The obtained mixture is kept for 10 minutes, then taken out from the flask, thoroughly filtrated and flow-washed by using ion exchanged water and further dispersed in ion exchanged water to give a solid content of 10 wt %. After adjusting the pH to 3.0 by adding a nitric acid, the mixture is stirred for 10 minutes and again thoroughly filtrated and flow—is hed by using ion exchanged water. The resulting slurry is freeze-dried to obtain a black toner (Toner K1).

Thereafter, silica ($SiO_2$) particles subjected to a surface hydrophobing treatment with hexamethyldisilazane (hereinafter sometimes simply referred to as "HMDS") and having an average primary particle diameter of 40 nm, and metatitanic acid compound particles having an average primary particle diameter of 20 nm, which is a reaction product of metatitanic acid and isobutyltrimethoxysilane, are added each in an amount of 1 wt % to the black toner obtained above and mixed in a Henschel mixer to produce a black external addition toner.

The accumulated volume average particle diameter $D_{50}$ and volume average particle size distribution index GSDv of the thus-produced toner are measured by a laser diffraction-type particle size distribution measuring device (LA-700, manufactured by Horiba Ltd.). The surface of this toner is observed through a scanning electron microscope (SEM) and the cross section thereof is observed by a transmission-type electron microscope (TEM), as a result, the resin, pigment and other additives are fused as intended and pores or irregularities are not observed. The dispersed state of the pigment is also good. Furthermore, the shape of the toner particle is observed by Luzex and it is confirmed that the toner particle has a potato shape with a shape factor SF1 of 131.

Example 7

Production of Cyan Toner (Toner C1)

A cyan toner is obtained in the same manner as the black toner produced above, except for changing Black Pigment Liquid Dispersion (K1) to a cyan pigment liquid dispersion, and the accumulated volume average particle diameter $D_{50}$ and volume average particle size distribution index GSDv are measured. Also, the surface and cross section of this toner are observed in the same manner as in Example 6, as a result, it is confirmed that the fused state of toner, the dispersed state of additives and the appearance are good and the toner particle has a potato shape with a shape factor SF1 of 130. Similarly to Example 6, external additives are externally added to this toner to obtain a cyan external addition toner.

Example 8

Production of Yellow Toner (Toner Y1)

A yellow toner is obtained in the same manner as the black toner produced above, except for changing Black Pigment Liquid Dispersion (K1) to a yellow pigment liquid dispersion, and the accumulated volume average particle diameter $D_{50}$ and volume average particle size distribution index GSDv are measured. Also, the surface and cross section of this toner are observed in the same manner as in Example 6, as a result, it is confirmed that the fused state of toner, the dispersed state of additives and the appearance are good and the toner particle has a potato shape with a shape factor SF1 of 131. Similarly to Example 6, external additives are externally added to this toner to obtain a yellow external addition toner.

Example 9

Production of Magenta Toner (Toner M1)

A magenta toner is obtained in the same manner as the black toner produced above, except for changing Black Pigment Liquid Dispersion (K1) to a magenta pigment liquid dispersion, and the accumulated volume average particle diameter $D_{50}$ and volume average particle size distribution index GSDv are measured. Also, the surface and cross section of this toner are observed in the same manner as in Example 6, as a result, it is confirmed that the fused state of toner, the dispersed state of additives and the appearance are good and the toner particle has a potato shape with a shape factor SF1 of 132. Similarly to Example 6, external additives are externally added to this toner to obtain a magenta external addition toner.

Example 10

Production of Toner Using Resin Particle Liquid Dispersion 2

Cyan Toner (C2) is obtained in the same manner as in Example 7 except for changing the resin particle liquid dispersion to Resin Particle Liquid Dispersion 2. The surface and cross section of this toner are observed in the same manner as in Example 6, as a result, it is confirmed that the fused state of toner, the dispersed state of additives and the appearance are good and the toner particle has a potato shape with a shape factor SF1 of 130. Similarly to Example 6, external additives are externally added to this toner to obtain a cyan external addition toner.

Example 11

Production of Toner Using Resin Particle Liquid Dispersion 3

Cyan Toner (C3) is obtained in the same manner as in Example 7 except for changing the resin particle liquid dispersion to Resin Particle Liquid Dispersion 3. The surface and cross section of this toner are observed in the same manner as in Example 6, as a result, it is confirmed that the fused state of toner, the dispersed state of additives and the appearance are good and the toner particle has a potato shape with a shape factor SF1 of 131. Similarly to Example 6, external additives are externally added to this toner to obtain a cyan external addition toner.

Example 12

Production of Toner Using Resin Particle Liquid Dispersion 4

Cyan Toner (C4) is obtained in the same manner as in Example 7 except for changing the resin particle liquid dispersion to Resin Particle Liquid Dispersion 4. The surface and cross section of this toner are observed in the same manner as in Example 6, as a result, it is confirmed that the fused state of toner, the dispersed state of additives and the appearance are good and the toner particle had a potato shape with a shape factor SF1 of 129. Similarly to Example 6, external additives are externally added to this toner to obtain a cyan external addition toner.

Example 13

Production of Toner Using Resin Particle Liquid Dispersion 5

Cyan Toner (C5) is obtained in the same manner as in Example 7 except for changing the resin particle liquid dispersion to Resin Particle Liquid Dispersion 5 and changing the blending amount of the resin particle liquid dispersion as follows. The surface and cross section of this toner are observed in the same manner as in Example 6, as a result, it is confirmed that the fused state of toner, the dispersed state of additives and the appearance are good and the toner particle has a potato shape with a shape factor SF1 of 130. Similarly to Example 6, external additives are externally added to this toner to obtain a cyan external addition toner.

Comparative Example 6

Production of Toner Using Resin Particle Liquid Dispersion 6

Black Toner (K6) is obtained in the same manner as in Example 6 except for changing the resin particle liquid dispersion to Resin Particle Liquid Dispersion 6. The surface and cross section of this toner are observed in the same manner as in Example 6, as a result, it is confirmed that the fused state of toner, the dispersed state of additives and the appearance are good and the toner particle has a potato shape with a shape factor SF1 of 131. Similarly to Example 6, external additives are externally added to this toner to obtain a black external addition toner.

Comparative Example 7

Cyan Toner (C6) is obtained in the same manner as in Comparative Example 6 except for changing the pigment liquid dispersion to a cyan pigment liquid dispersion. The surface and cross section of this toner are observed in the same manner as in Example 6, as a result, it is confirmed that the fused state of toner, the dispersed state of additives and the appearance are good and the toner particle has a potato shape with a shape factor SF1 of 132. Similarly to Example 6, external additives are externally added to this toner to obtain a cyan external addition toner.

Comparative Example 8

Yellow Toner (Y6) is obtained in the same manner as in Comparative Example 6 except for changing the pigment liquid dispersion to a yellow pigment liquid dispersion. The surface and cross section of this toner are observed in the same manner as in Example 6, as a result, it is confirmed that the fused state of toner, the dispersed state of additives and the appearance are good and the toner particle has a potato shape with a shape factor SF1 of 132. Similarly to Example 6, external additives are externally added to this toner to obtain a yellow external addition toner.

Comparative Example 9

Magenta Toner (M6) is obtained in the same manner as in Comparative Example 6 except for changing the pigment liquid dispersion to a magenta pigment liquid dispersion. The surface and cross section of this toner are observed in the same manner as in Example 6, as a result, it is confirmed that the fused state of toner, the dispersed state of additives and the appearance are good and the toner particle has a potato shape with a shape factor SF1 of 130. Similarly to Example 6, external additives are externally added to this toner to obtain a magenta external addition toner.

Comparative Example 10

Production of Toner Using Resin Particle Liquid Dispersion 7

Cyan Toner (C7) is obtained in the same manner as in Comparative Example 7 except for changing the resin particle liquid dispersion to Resin Particle Liquid Dispersion 7. The surface and cross section of this toner are observed in the same manner as in Example 6, as a result, it is confirmed that the fused state of toner or the dispersed state of additives is non-uniform and although the toner particle has a potato shape with a shape factor of 128, the fluctuation is large. Similarly to Example 6, external additives are externally added to this toner to obtain a cyan external addition toner.

Comparative Example 11

Production of Toner Using Resin Particle Liquid Dispersion 8

Cyan Toner (C8) is obtained in the same manner as in Comparative Example 7 except for changing the resin particle liquid dispersion to Resin Particle Liquid Dispersion 8. The surface and cross section of this toner are observed in the same manner as in Example 6, as a result, it is confirmed that the fused state of toner, the dispersed state of additives and the appearance are good and the toner particle has a potato shape with a shape factor of 130 but the fluctuation is large. Similarly to Example 6, external additives are externally added to this toner to obtain a cyan external addition toner.

Comparative Example 12

Production of Toner Using Resin Particle Liquid Dispersion 9

Cyan Toner (C9) is obtained in the same manner as in Comparative Example 7 except for changing the resin particle liquid dispersion to Resin Particle Liquid Dispersion 9. The surface and cross section of this toner are observed in the same manner as in Example 6, as a result, it is confirmed that the fused state of toner or the dispersed state of additives is non-uniform and although the toner particle has a potato shape with a shape factor of 125, the fluctuation is large. Similarly to Example 6, external additives are externally added to this toner to obtain a cyan external addition toner.

Comparative Example 13

Production of Toner Using Resin Particle Liquid Dispersion 10

Cyan Toner (C10) is obtained in the same manner as in Comparative Example 7 except for changing the resin particle liquid dispersion to Resin Particle Liquid Dispersion 10. The surface and cross section of this toner are observed in the same manner as in Example 6, as a result, it is confirmed that the fused state of toner or the dispersed state of additives is non-uniform and the toner particle has a potato shape with a shape factor of 124. Similarly to Example 6, external additives are externally added to this toner to obtain a cyan external addition toner.

Comparative Example 14

Production of Toner Using Resin Particle Liquid Dispersion A

Cyan Toner (C-A) is obtained in the same manner as in Comparative Example 7 except for changing the resin particle liquid dispersion to Resin Particle Liquid Dispersion A, that is, constituting the resin particle liquid dispersions entirely by Resin Particle Liquid Dispersion A. The surface and cross section of this toner are observed in the same manner as in Example 6, as a result, it is confirmed that the fused state of toner, the dispersed state of additives and the appearance are good and the toner particle has a potato shape with a shape factor of 131. Similarly to Example 6, external additives are externally added to this toner to obtain a cyan external addition toner.

[Production of Carrier]

A methanol solution containing 0.1 part by weight of γ-aminopropyltriethoxysilane is added to 100 parts by weight of Cu—Zn ferrite particles having a volume average particle diameter of 40 μm and after coating in a kneader, methanol is removed by distillation. The obtained silane compound is heated at 120° C. for 2 hours and thereby completely hardened. The particles obtained are mixed with a perfluorooctylethyl methacrylate-methyl methacrylate copolymer (copolymerization ratio: 40:60) dissolved in toluene, and the resulting mixture is subjected to a vacuum kneader to produce a resin-coated carrier in which the amount of the perfluorooctylethyl methacrylate-methyl methacrylate copolymer coating is 0.5 wt %.

[Production of Developer]

100 Parts by weight of the thus-obtained resin-coated carrier is mixed with 4 parts by weight of each of the toners produced above to produce an electrostatic image developer. These developers are used as the developer in the following evaluations.

With respect to the toners and developers obtained as above, the thermal storability of toner is evaluated, and the minimum fixing temperature and temperature of generating image deterioration (hereinafter referred to as "uneven permeation") due to permeation phenomenon are determined by evaluating the fixed image with an eye.

<Measurement of Minimum Fixing Temperature and Uneven Permeation-Generating Temperature>

The minimum fixing temperature is defined as the temperature of bringing disappearance of image deterioration (hereinafter referred to as "uneven density") caused due to insufficient melting of toner. The uneven permeation-generating temperature is defined as the temperature of causing generation of a white shining spot in a solid image.

These are evaluated by using modified Docu Centre Color 500CP manufactured by Xerox Co., Ltd., which is modified to make variable the roll temperature of the fixing unit, at a process speed of 180 mm/sec. The paper sheet used is J coat paper produced by Fuji Xerox Office Supply Co., Ltd. for the measurement of the minimum fixing temperature, and ST paper and WR-100 paper (both recycled paper, produced by Fuji Xerox Office Supply Co., Ltd.) for the measurement of the uneven permeation-generating temperature.

In general, it is known that uneven permeation is more readily generated as the paper density is lower or the smoothness of paper surface is poorer. Accordingly, when thin paper with low paper density or recycled paper (for example, "ST paper", "WR-100 paper" and "Green 100 paper", produced by Fuji Xerox Office Supply Co., Ltd.) having blended therein waste paper with poor smoothness of paper surface is used, the fixing temperature range may become narrow.

<Evaluation of Thermal Storability (Heat Blocking Resistance) of Toner>

First, 5 g of the toner is left standing in a chamber at 40° C. and 50% RH for 17 hours. After returning the temperature to room temperature, 2 g of the toner is charged into a mesh having a sieve opening of 45 μm and vibrated under fixed conditions. The weight of the toner remaining on the mesh is measured, and the weight ratio to the amount charged is calculated. The obtained numerical value is used as the index for heat blocking resistance of the toner.

The thermal storability of the toner is rated as follows:
A: the index of heat blocking resistance is 3% or less;
B: more than 3% to 5%;
C: more than 5% to 10%; and
D: more than 10%.

TABLE 2

Accumulated     Volume Average     Minimum     Uneven Permeation-

| Toner | Resin Liquid Dispersion | Volume Average Particle Diameter $D_{50}$ (μm) | Particle Distribution GSDv | Fixing Temperature (° C.) | Generating Temperature (° C.) S Paper | Generating Temperature (° C.) WR Paper | Thermal Storability of Toner |
|---|---|---|---|---|---|---|---|
| Example 6 | K1 | 1 | 5.8 | 1.22 | 110 | 175 | 165 | A |
| Example 7 | C1 | 1 | 5.8 | 1.24 | 115 | 170 | 160 | A |
| Example 8 | Y1 | 1 | 6.0 | 1.23 | 110 | 170 | 165 | A |
| Example 9 | M1 | 1 | 5.9 | 1.23 | 110 | 175 | 165 | A |
| Example 10 | C2 | 2 | 5.8 | 1.25 | 115 | 170 | 160 | A |
| Example 11 | C3 | 3 | 5.7 | 1.22 | 105 | 160 | 155 | A |
| Example 12 | C4 | 4 | 6.1 | 1.26 | 110 | 165 | 155 | B |
| Example 13 | C5 | 5 | 5.9 | 1.24 | 115 | 170 | 160 | A |
| Comparative Example 6 | K6 | 6 | 5.9 | 1.23 | 120 | 150 | 140 | D |
| Comparative Example 7 | C6 | 6 | 5.8 | 1.25 | 120 | 155 | 135 | D |
| Comparative Example 8 | Y6 | 6 | 5.9 | 1.22 | 115 | 155 | 145 | C |
| Comparative Example 9 | M6 | 6 | 5.9 | 1.23 | 120 | 155 | 130 | D |
| Comparative Example 10 | C7 | 7 | 5.7 | 1.25 | 110 | 150 | 135 | C |
| Comparative Example 11 | C8 | 8 | 5.8 | 1.22 | 120 | 155 | 140 | C |
| Comparative Example 12 | C9 | 9 | 5.9 | 1.41 | 135 | 145 | 140 | D |
| Comparative Example 13 | C10 | 10 | 6.1 | 1.26 | 130 | 155 | 145 | C |
| Comparative Example 14 | C-A | A | 5.8 | 1.22 | 145 | 170 | 165 | A |

As seen from these results, the electrostatic image developing toner produced by using the resin particle liquid dispersion of the present invention has stable toner storability and a wide fixing possible temperature region independent of the paper used. Furthermore, the production method for the toner enables the production by a consistent process with energy saving and ensures a toner having high storability and excellent particle size controllability, as compared with the process of producing a toner by using a conventional polycondensable resin.

According to the present invention, a resin particle liquid dispersion for an electrostatic image developing toner, having a viscoelasticity, a particle diameter and a particle diameter distribution suitable for a toner, can be provided.

Also, according to the present invention, an electrostatic image developing toner assured of a stable toner storability and a wide fixing possible temperature region independent of the paper used can be provided. Furthermore, a production process of an electrostatic image developing toner, which enables the production by a consistent process with energy saving, can be provided.

The entire disclosure of Japanese Patent Application No. 2005-209848 filed on Jul. 20, 2005 including specification, claims, drawings and abstract is incorporated herein by reference in its entirely.

What is claimed is:

1. A method for producing a resin particle liquid dispersion for an electrostatic image developing toner, the method comprising:

preparing an emulsified liquid dispersion comprising an aqueous medium and an oil phase comprising at least polycondensable monomers and radical polymerizable monomers, the oil phase being dispersed in the aqueous medium;

polycondensing the polycondensable monomers to obtain a polyester resin particle comprising a polycondensable polymer, the polyester resin particle being dispersed in the aqueous medium to have a median diameter of 0.05 to 1.0 μm;

polymerizing the radical polymerizable monomers after the polycondensing to obtain the resin particle liquid dispersion; and rapidly cooling the resin particle liquid dispersion to a range between a temperature of −10° C. and a temperature that is 60° C. lower than the polycondensation temperature (Tc) at a rate of 3 to 20° C./min after the polymerizing, wherein a storage modulus GL(30) of the polyester resin particle at 30° C. is $1 \times 10^7$ Pa or more, and a melting point of the polyester resin particle is from 45 to 110° C., and the polycondensable monomers include a polyisocyanate having 1.5 or more isocyanate groups on average within one molecule of the polyisocyanate and a constitutional ratio of the polyisocyanate is from 20.0 to 90.0 wt % based on all monomers constituting the polyester resin particle.

2. The method according to claim 1, wherein a storage modulus change of the polyester resin particle of $10^6$ Pa to $10^4$ Pa occurs by a temperature change within 10° C.

3. The method according to claim 1, wherein a storage modulus change of the polyester resin particle of $10^7$ Pa to $10^3$ Pa occurs by a temperature change within 20° C.

4. The method according to claim 1, wherein when a common logarithm of the storage modulus of the polyester resin particle is plotted with respect to temperature, and if the melting point of the polyester resin particle is Tm, a storage modulus at Tm+20° C. is G'(Tm+20), and a storage modulus at Tm+50° C. is G'(Tm+50), the condition of the following formula (1) is satisfied:

$$|\log G'(Tm+20) - \log G'(Tm+50)| \leq 1.5 \qquad (1).$$

5. The method according to claim 1, wherein a constitutional ratio of at least one of: an unsaturated bond-containing carboxylic acid; its acid anhydride; and its lower ester is from 20.0 to 50.0 wt % based on all monomers constituting the polyester resin particle.

6. The method according to claim 1, wherein the polyester resin particle has an acid value of 1 to 50 mg KOH/g.

7. The method according to claim 1, wherein the polyester resin particle has a glass transition temperature Tg of 40 to 100° C.

8. The method according to claim 1, wherein if a melting point of the polyester resin particle is Tm, a polycondensation temperature Tc satisfies (Tm−20° C.)<Tc<(Tm+20° C.).

9. The method according to claim 1, wherein if the highest temperature out of melting points of the polycondensable monomers is Th, the polycondensation temperature Tc satisfies 45'C<Tc<Th.

* * * * *